W. C. BRIGGS.
MACHINE FOR APPLYING BANDS, LABELS, OR WRAPPERS TO CIGARS OR OTHER ARTICLES.
APPLICATION FILED NOV. 15, 1905.
1,004,141.  Patented Sept. 26, 1911.
16 SHEETS—SHEET 6.
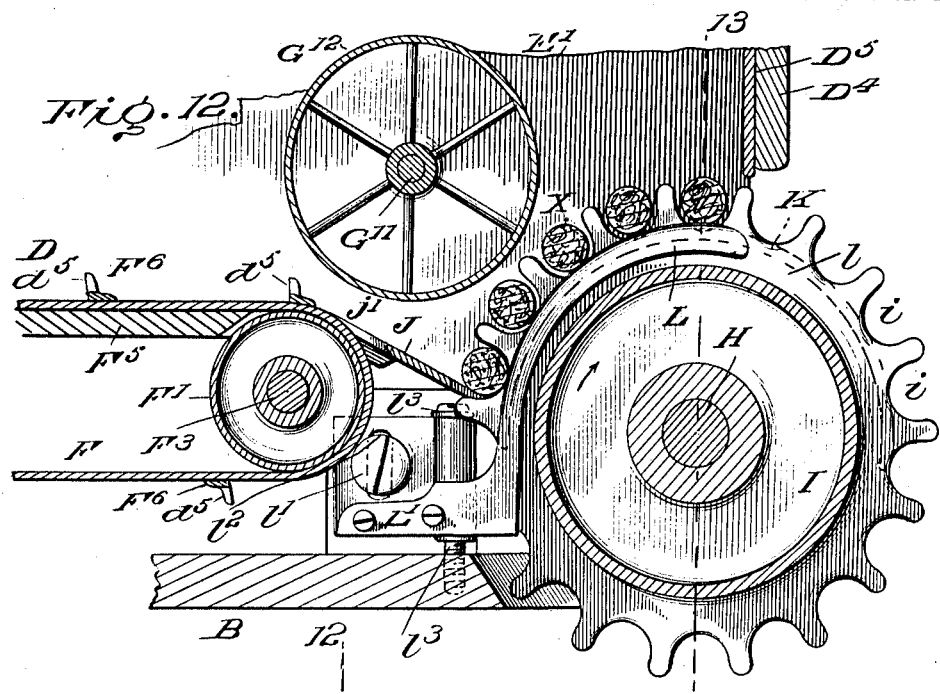
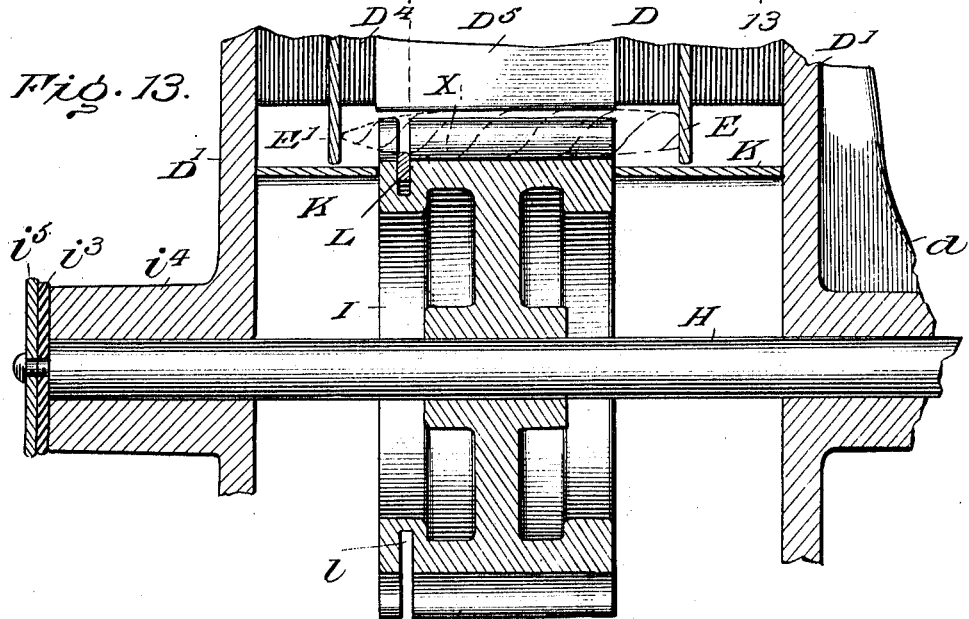
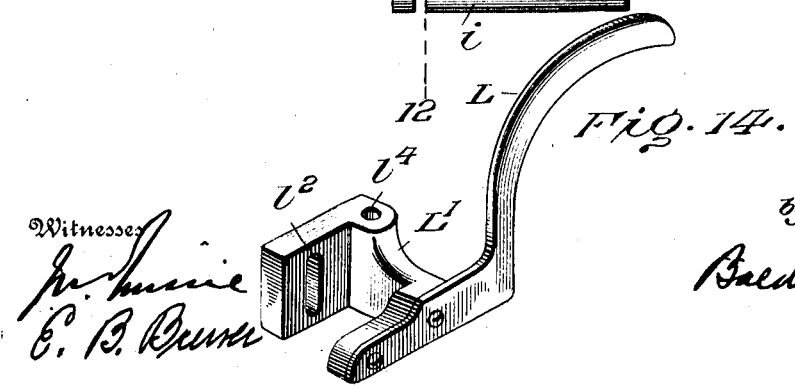

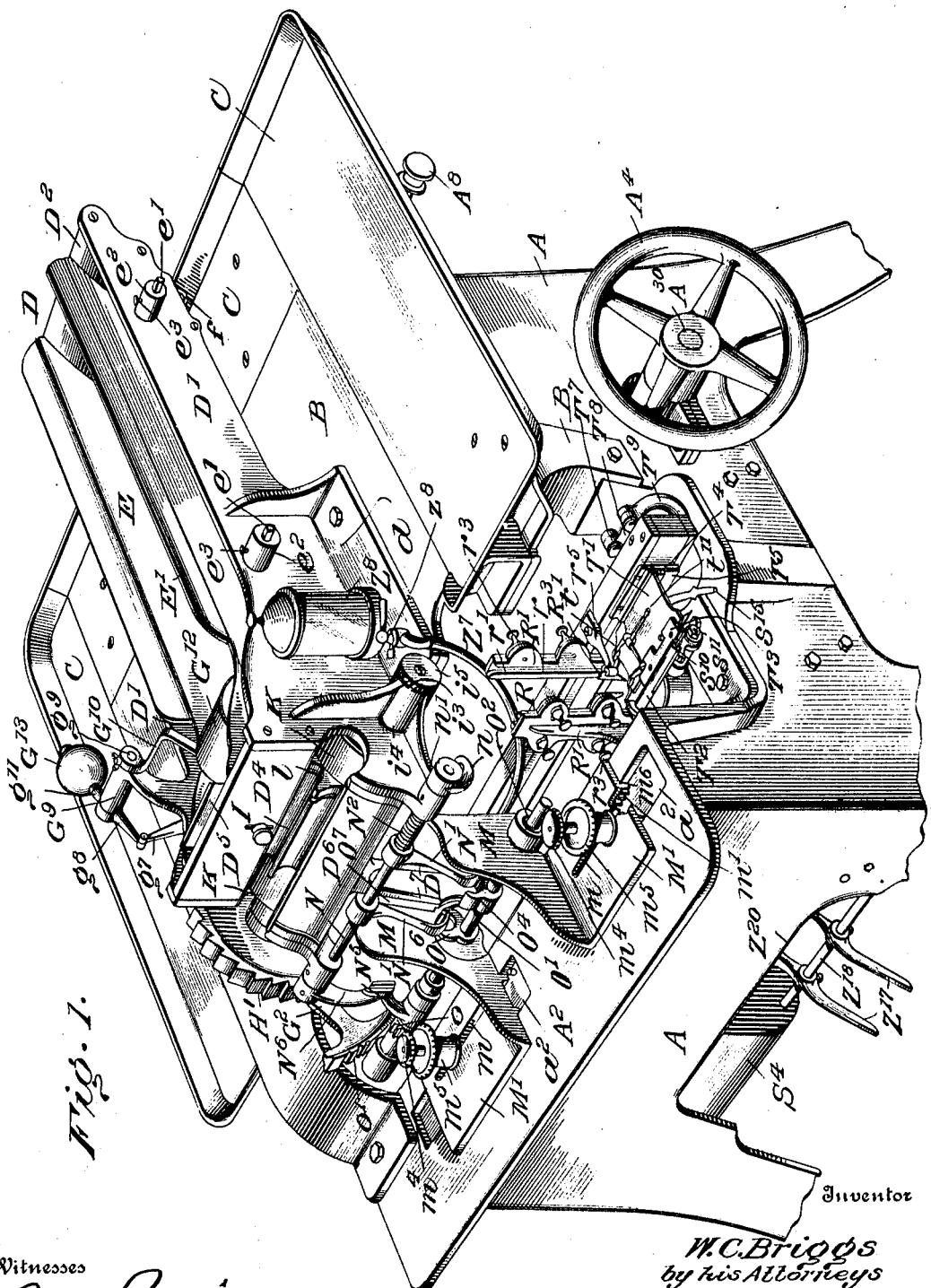

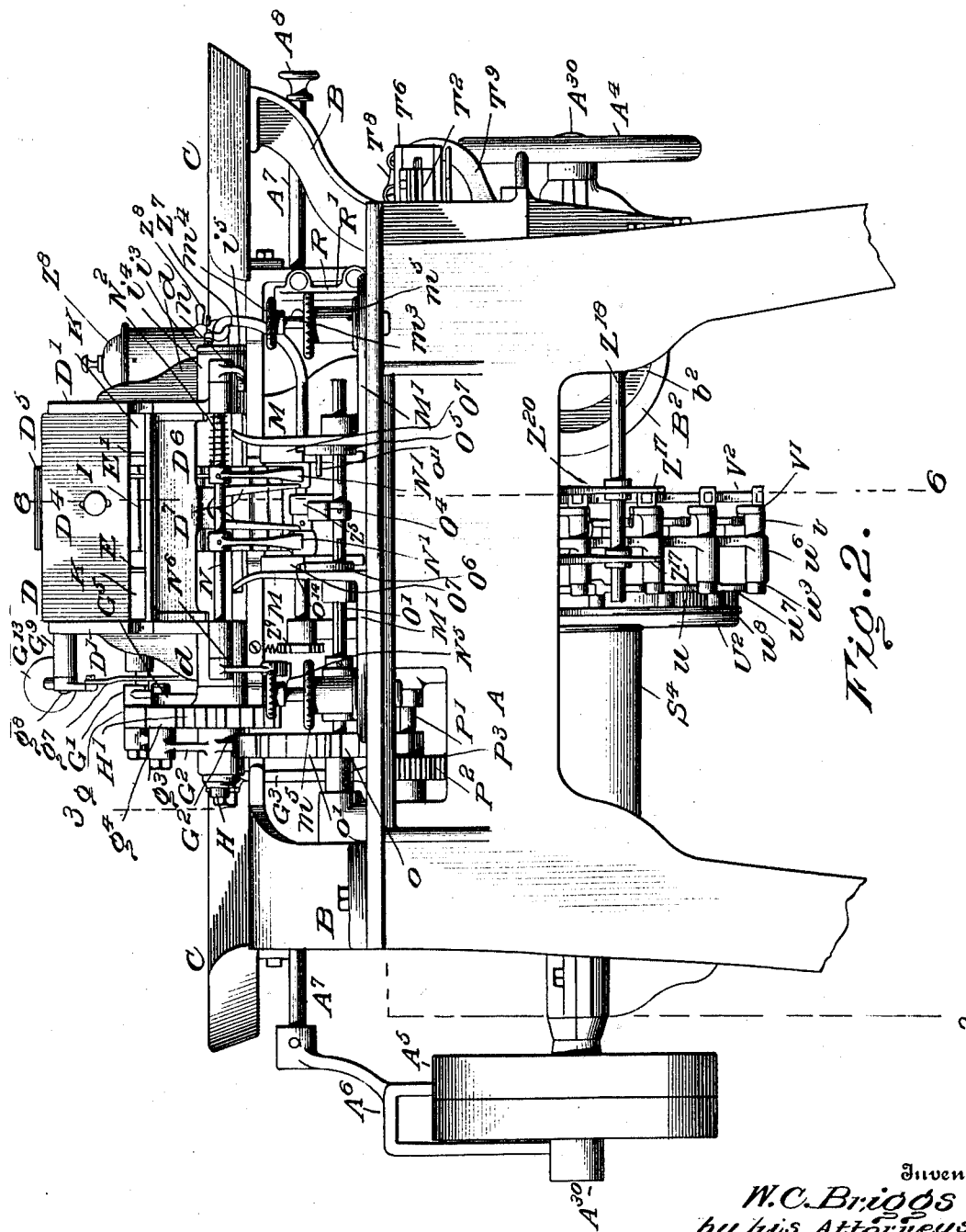

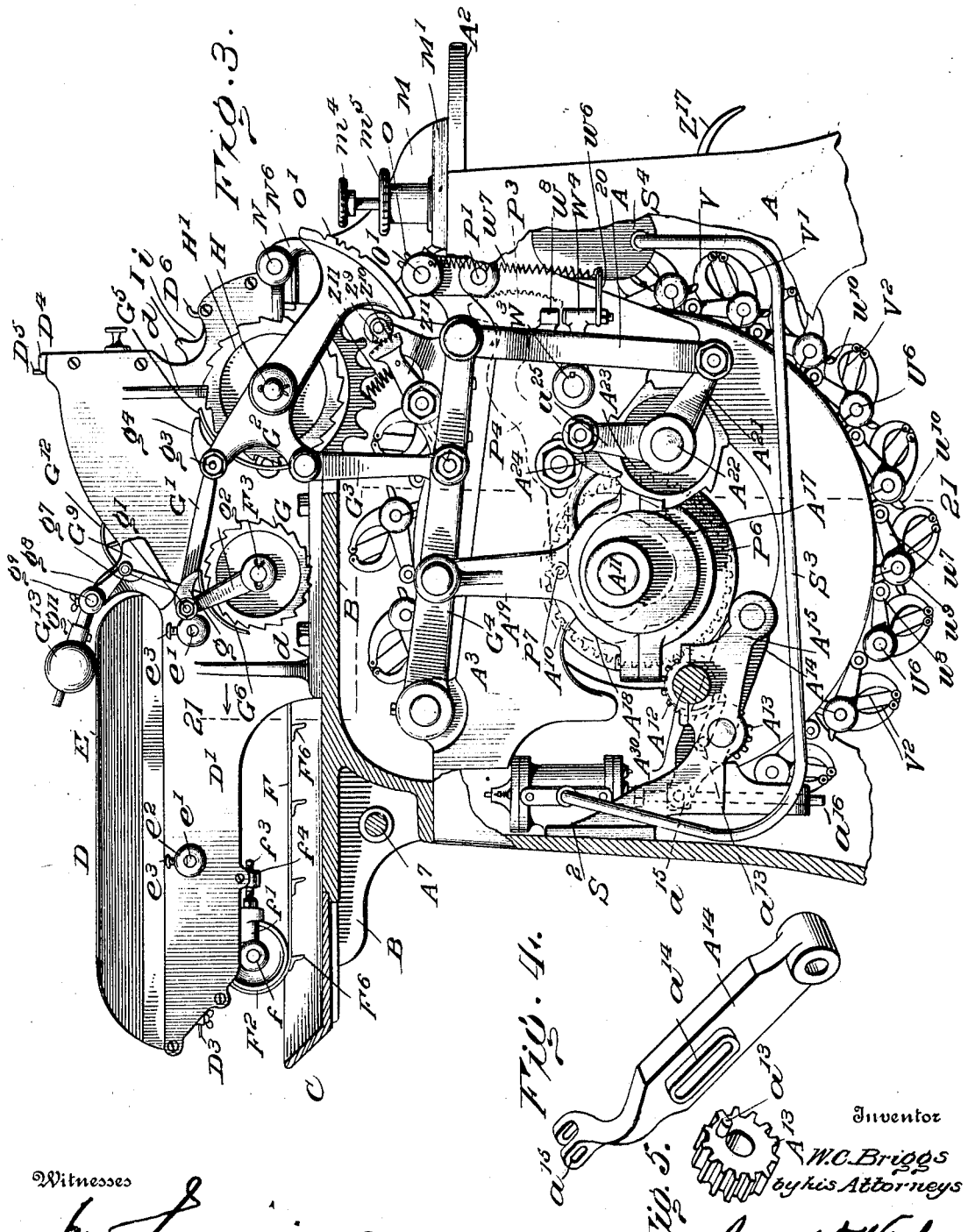

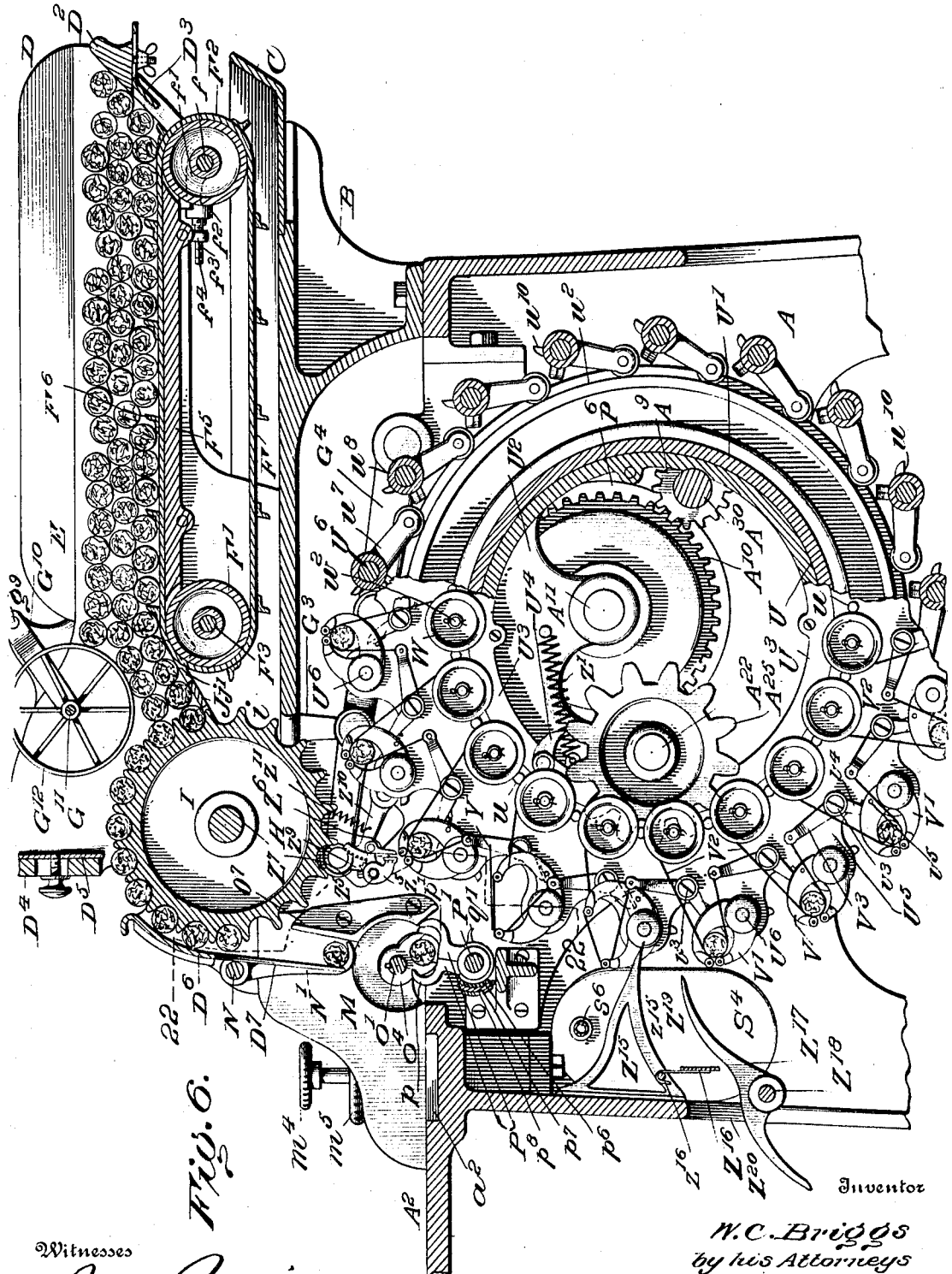

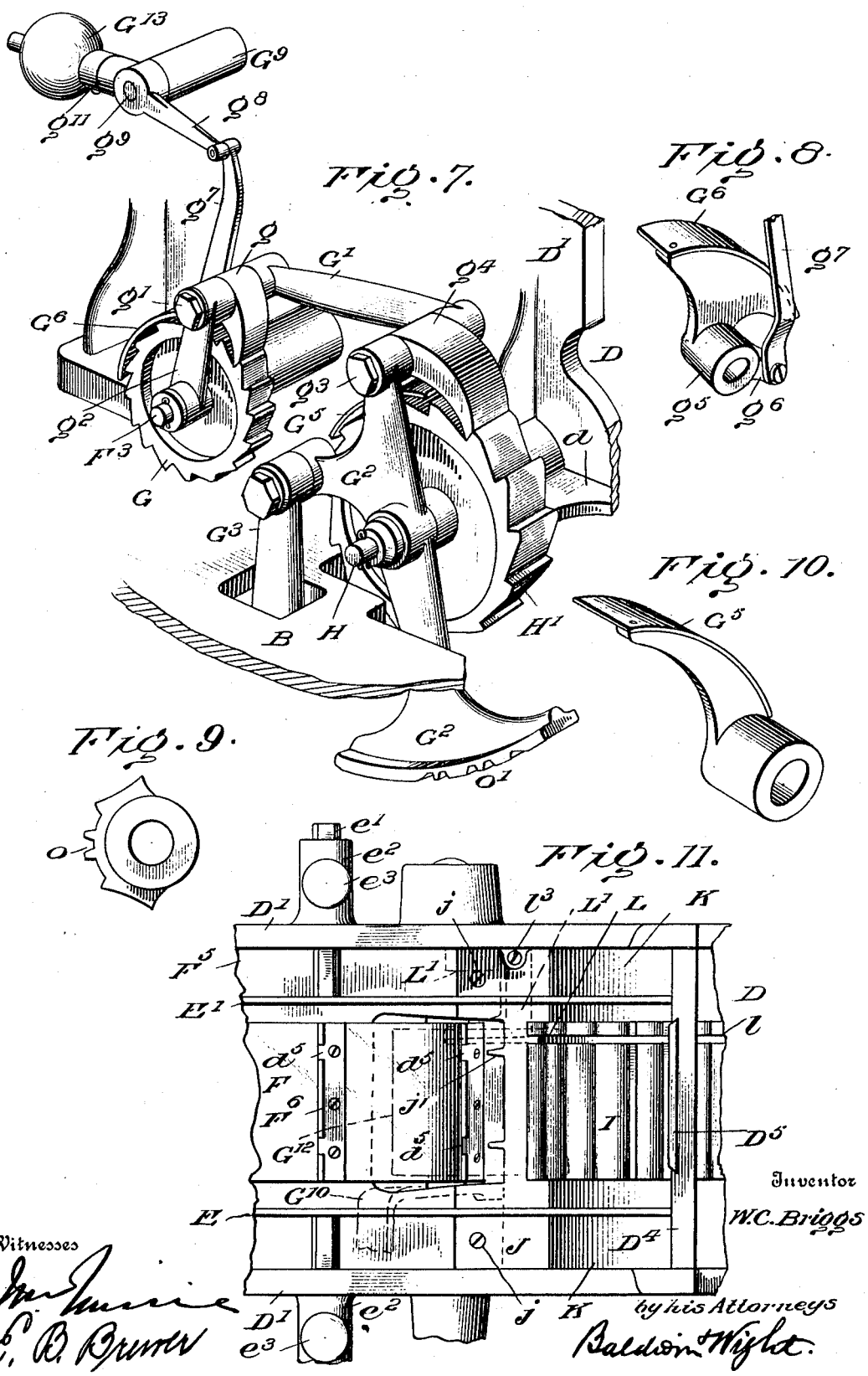

W. C. BRIGGS.
MACHINE FOR APPLYING BANDS, LABELS, OR WRAPPERS TO CIGARS OR OTHER ARTICLES.
APPLICATION FILED NOV. 15, 1905.
1,004,141.
Patented Sept. 26, 1911.
16 SHEETS—SHEET 7.
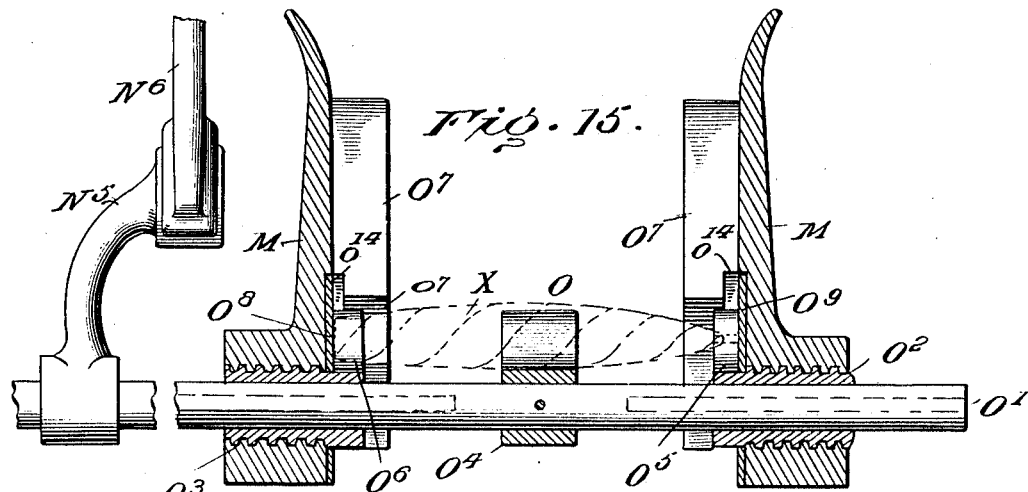
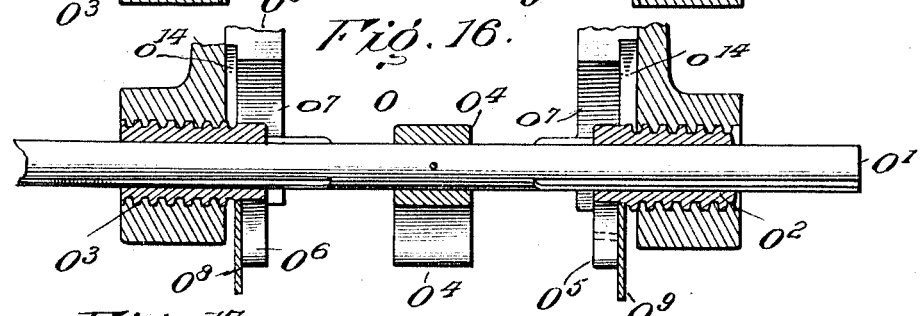
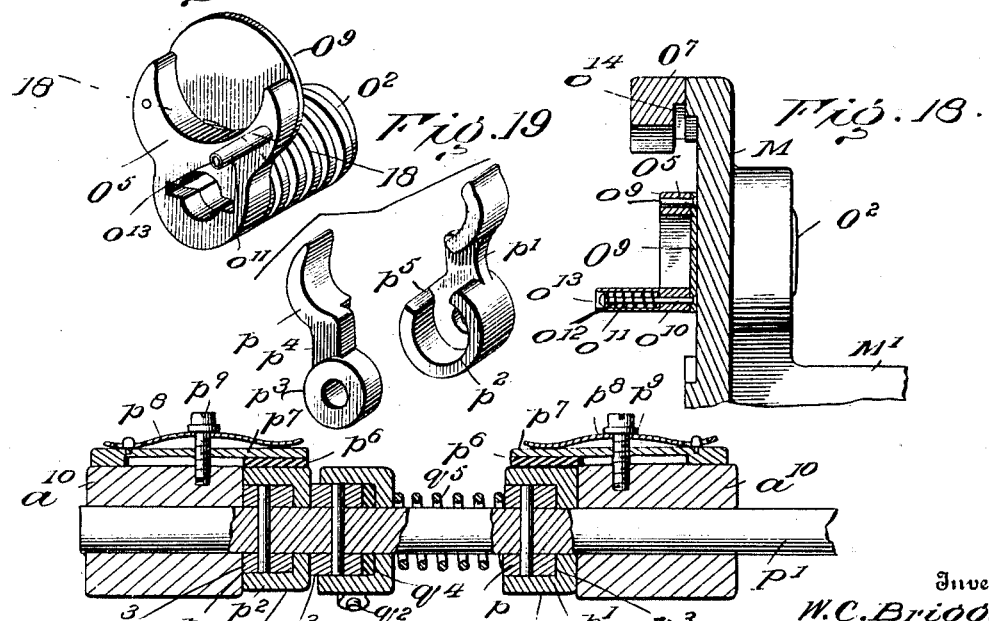
Witnesses
Inventor
W. C. Briggs
by his Attorneys
Baldwin Wight

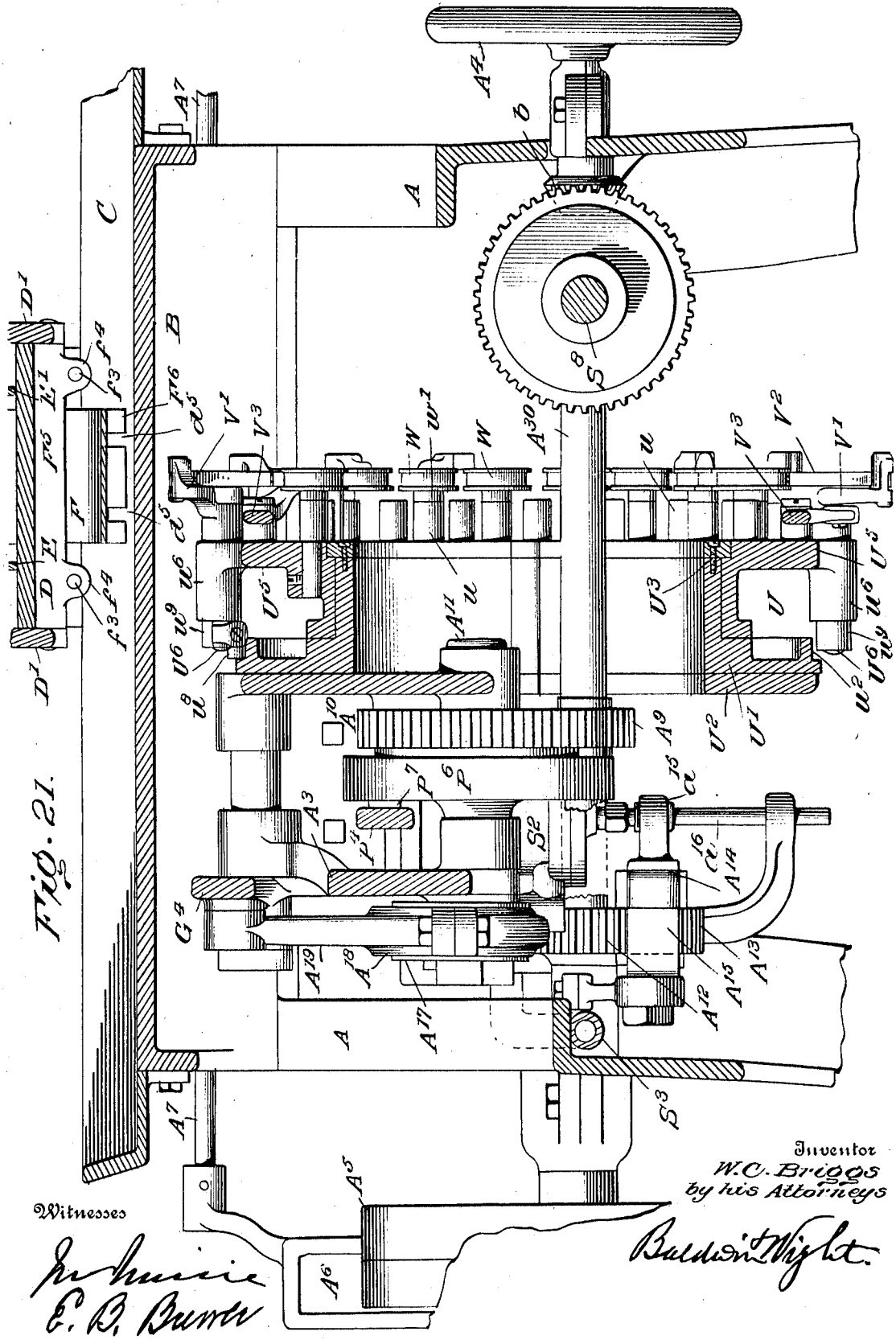

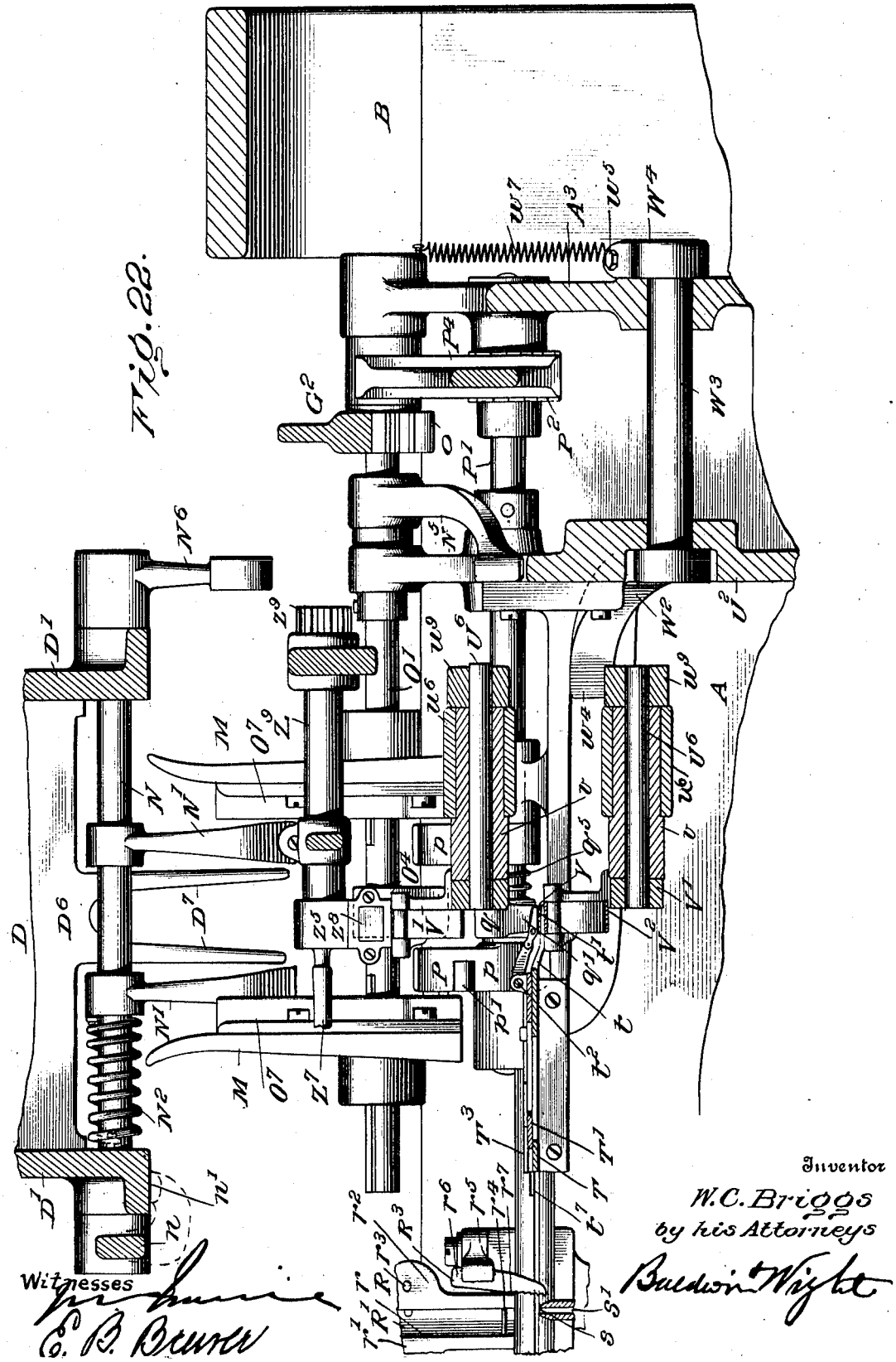

W. C. BRIGGS.
MACHINE FOR APPLYING BANDS, LABELS, OR WRAPPERS TO CIGARS OR OTHER ARTICLES.
APPLICATION FILED NOV. 15, 1905.
1,004,141.
Patented Sept. 26, 1911.
16 SHEETS—SHEET 10.
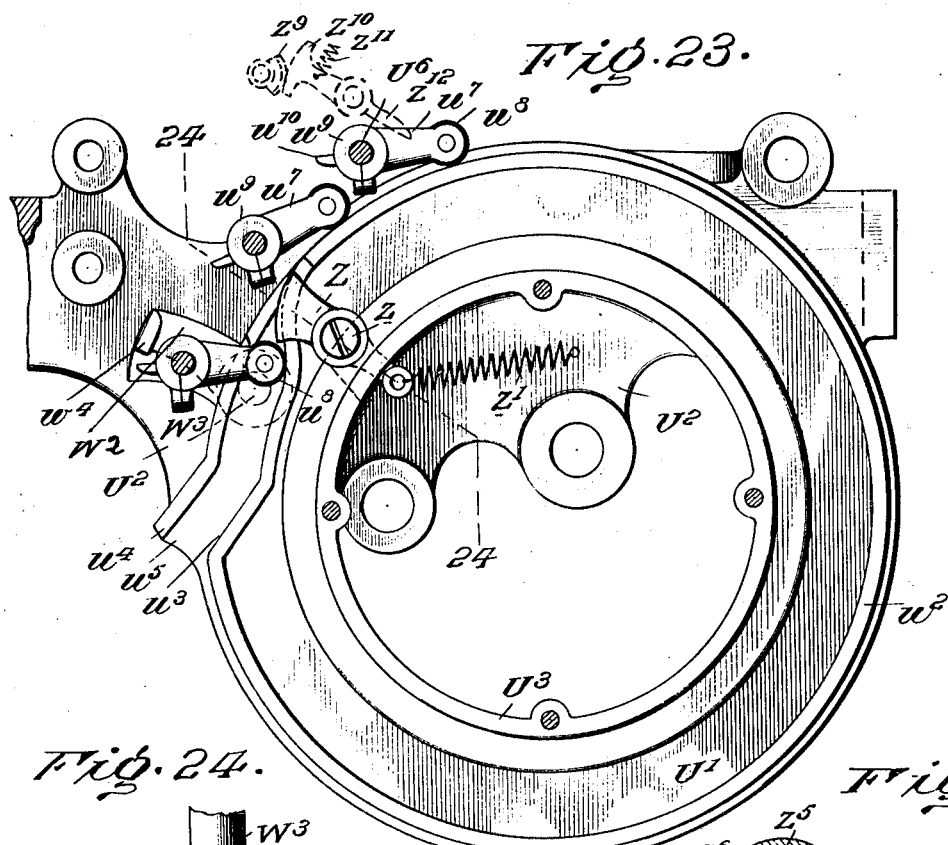
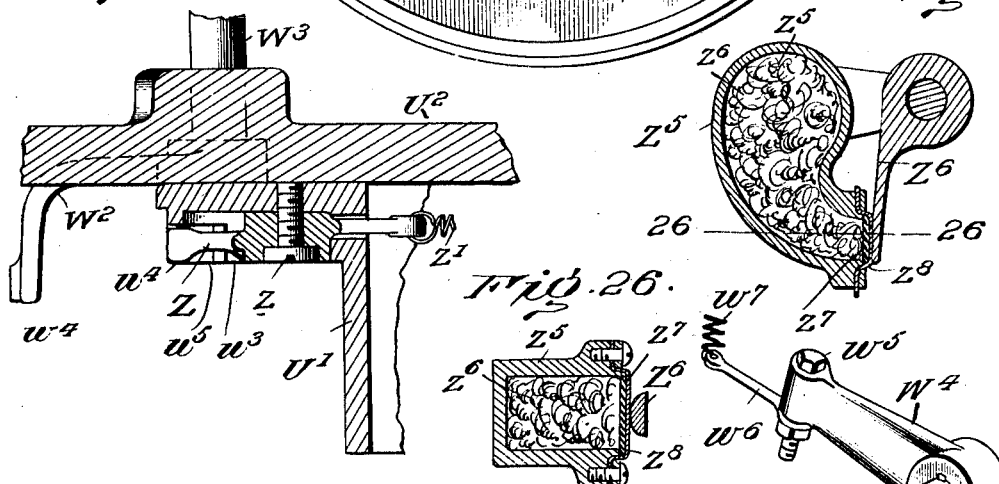
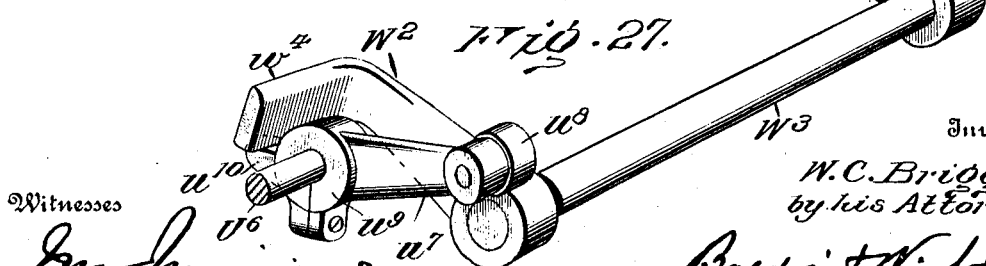

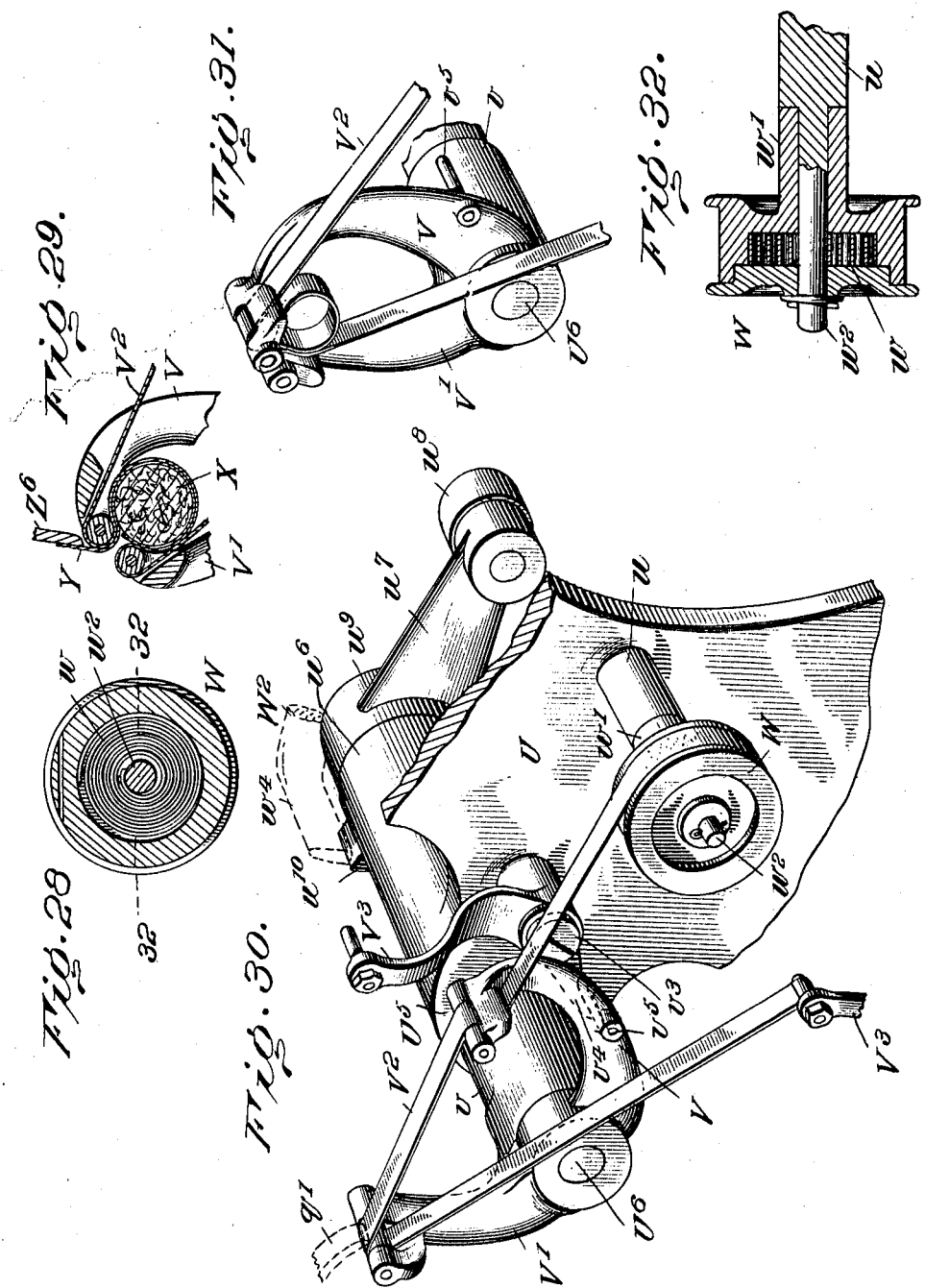

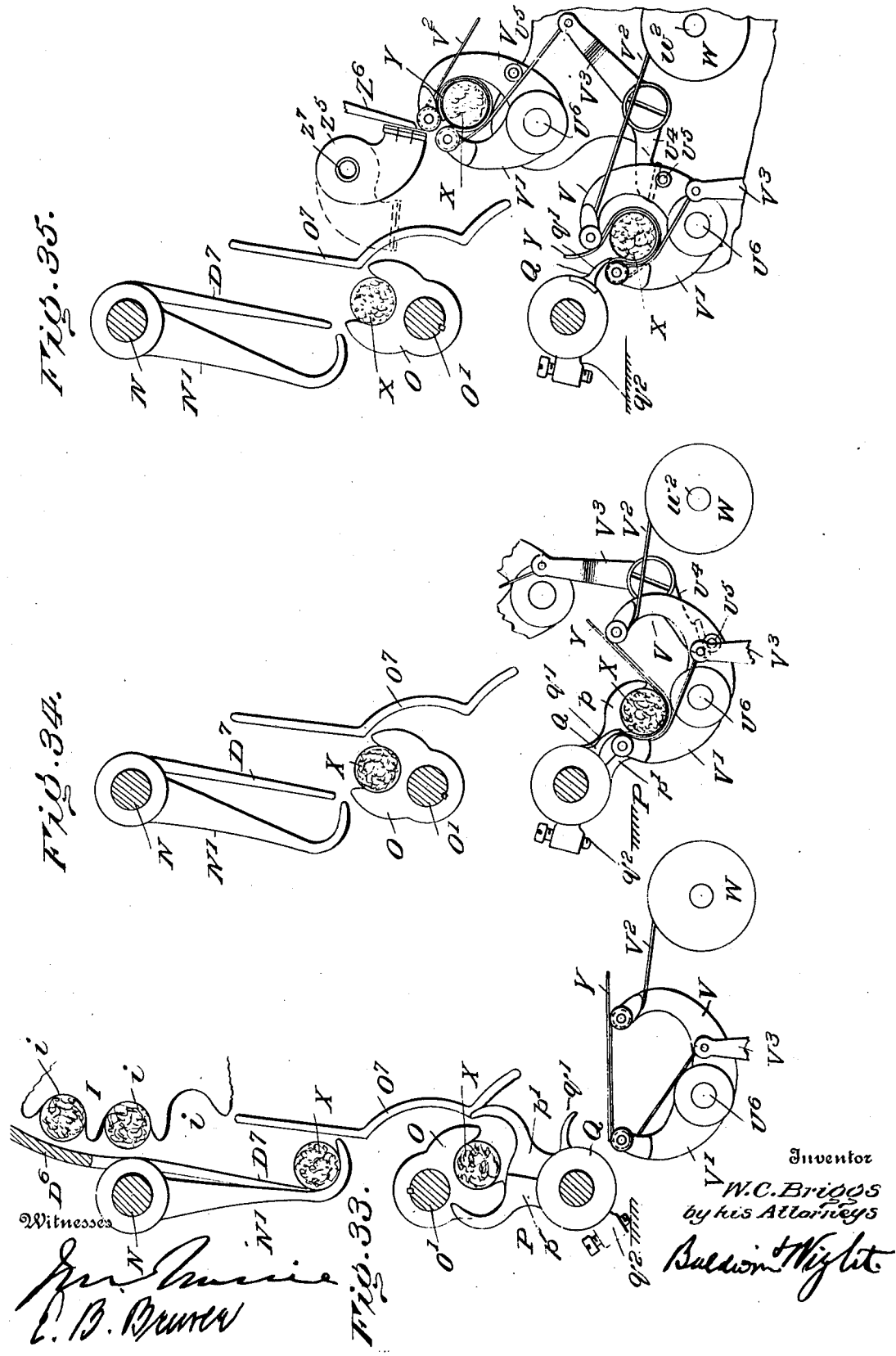

W. C. BRIGGS.
MACHINE FOR APPLYING BANDS, LABELS, OR WRAPPERS TO CIGARS OR OTHER ARTICLES.
APPLICATION FILED NOV. 15, 1905.
1,004,141.
Patented Sept. 26, 1911.
16 SHEETS—SHEET 13.
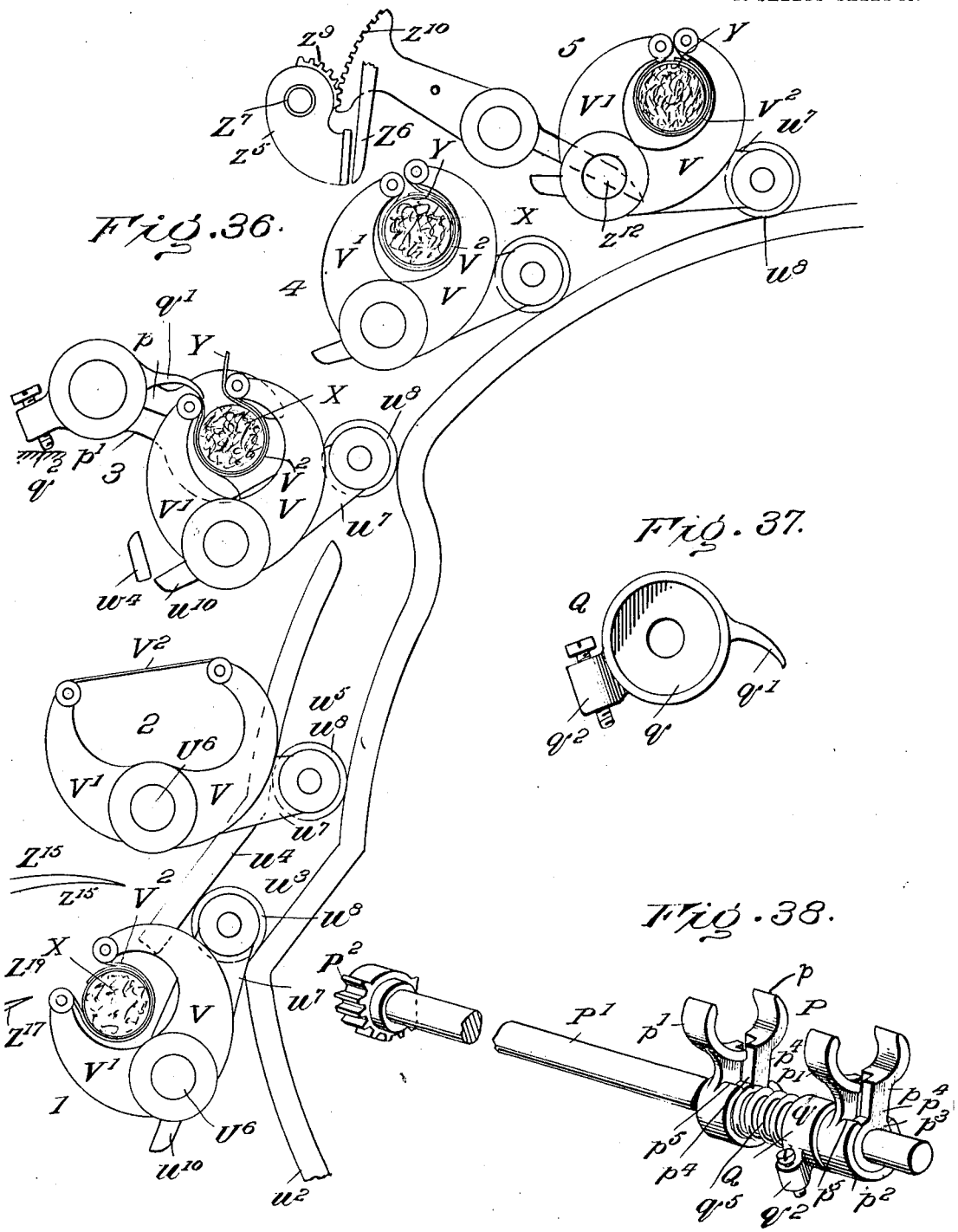

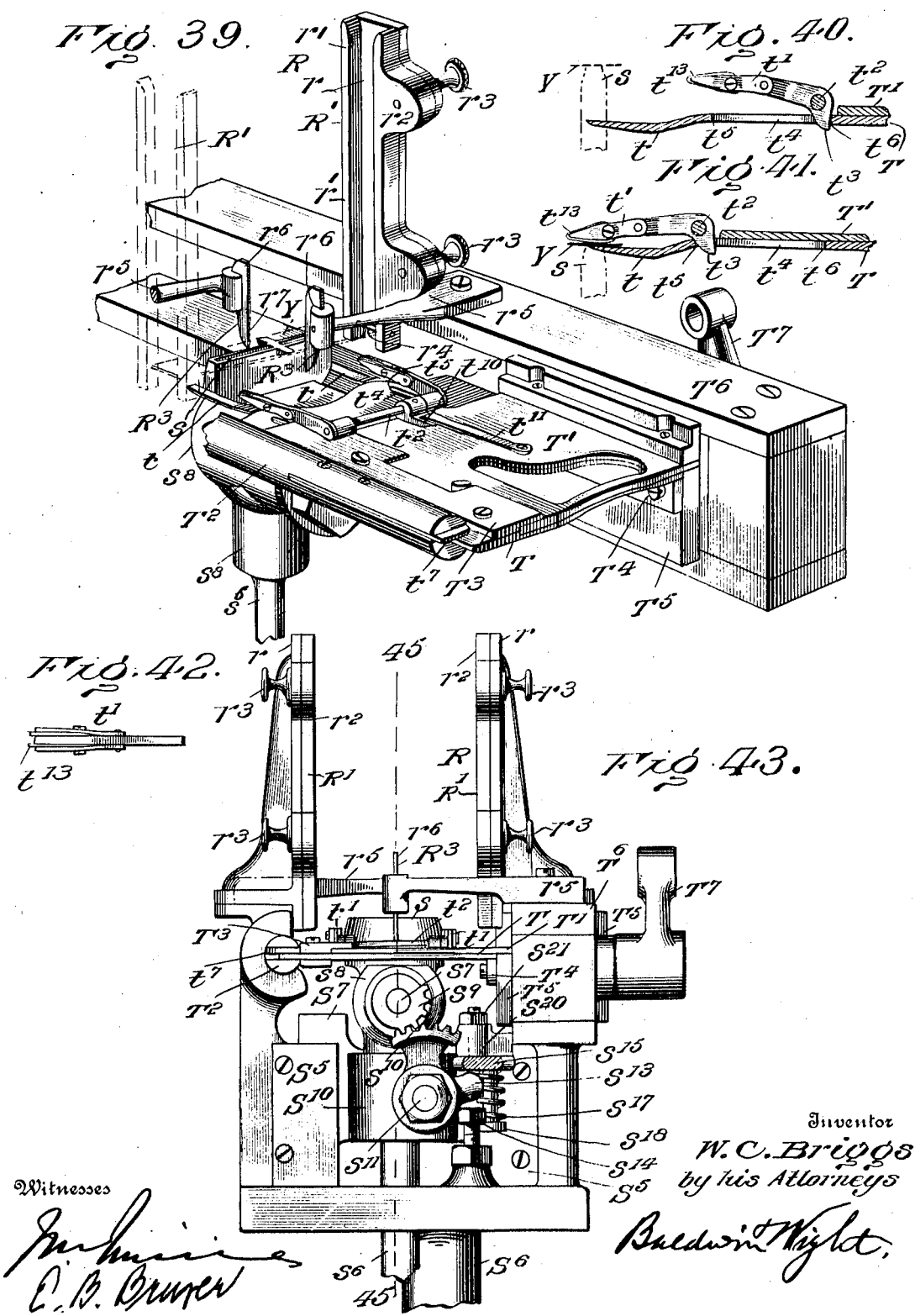

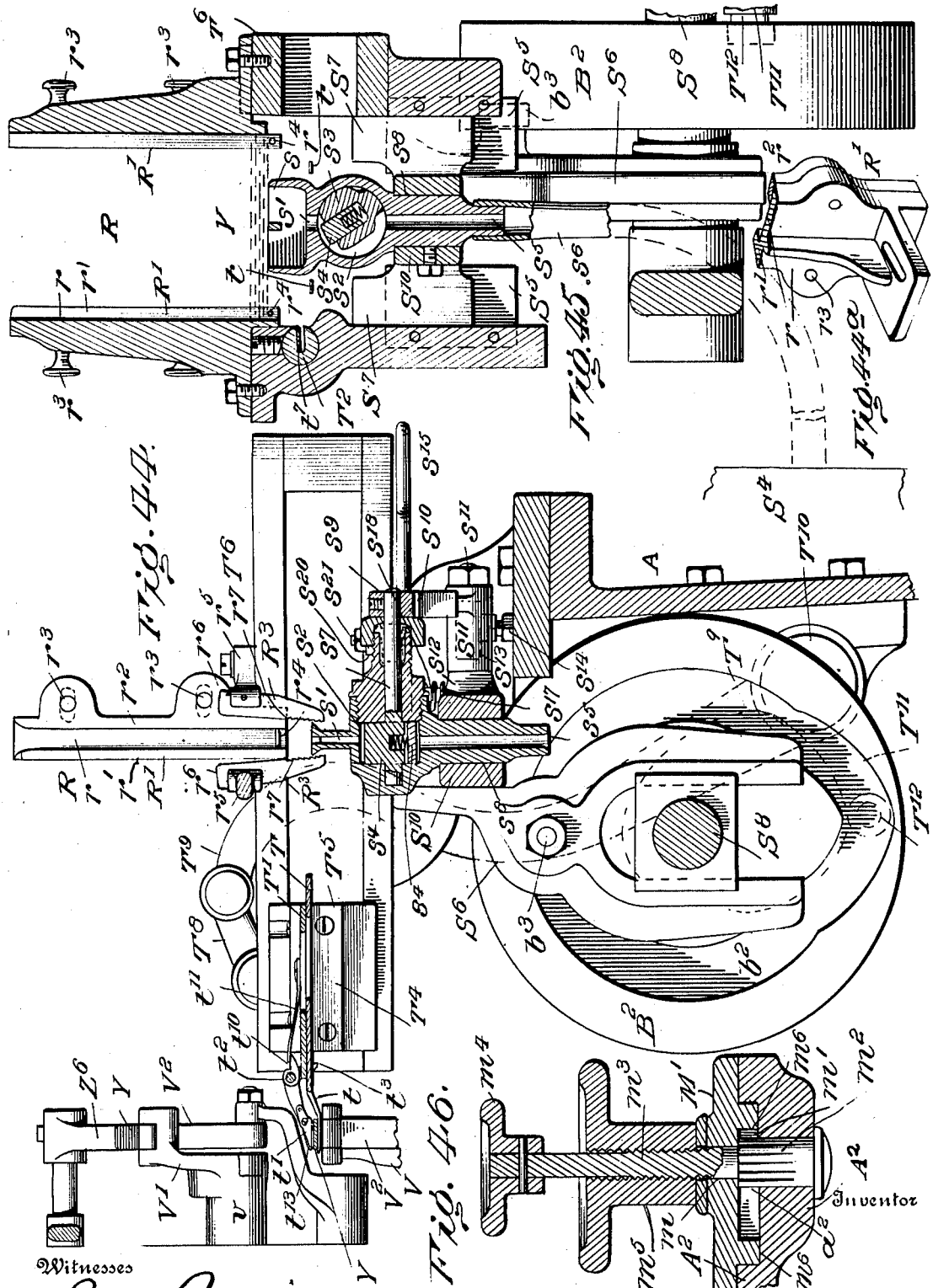

W. C. BRIGGS.
MACHINE FOR APPLYING BANDS, LABELS, OR WRAPPERS TO CIGARS OR OTHER ARTICLES.
APPLICATION FILED NOV. 15, 1905.
1,004,141.
Patented Sept. 26, 1911.
16 SHEETS—SHEET 16.
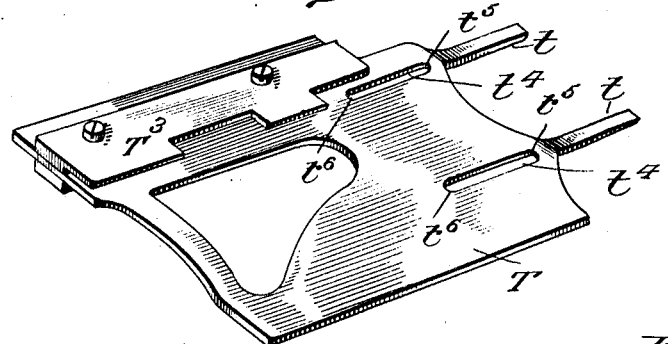
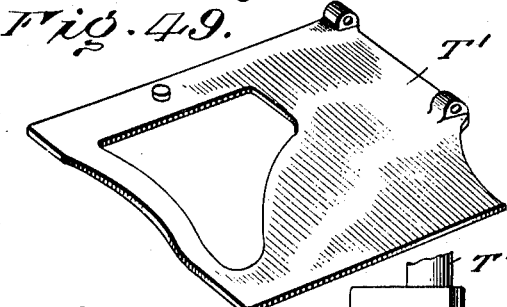
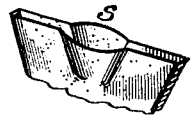
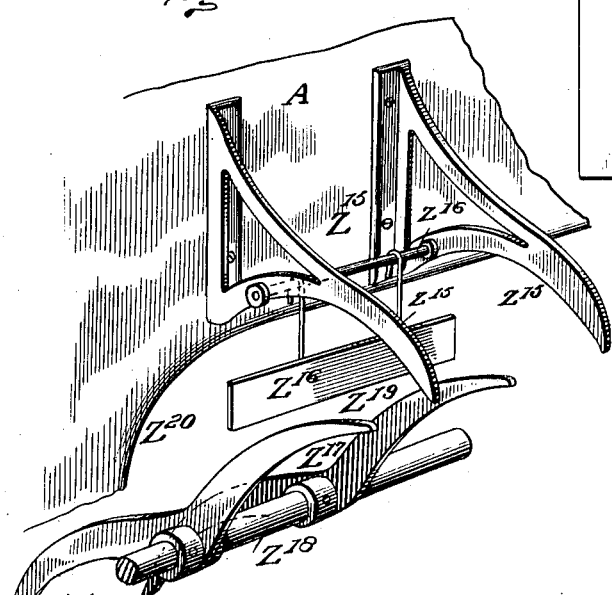
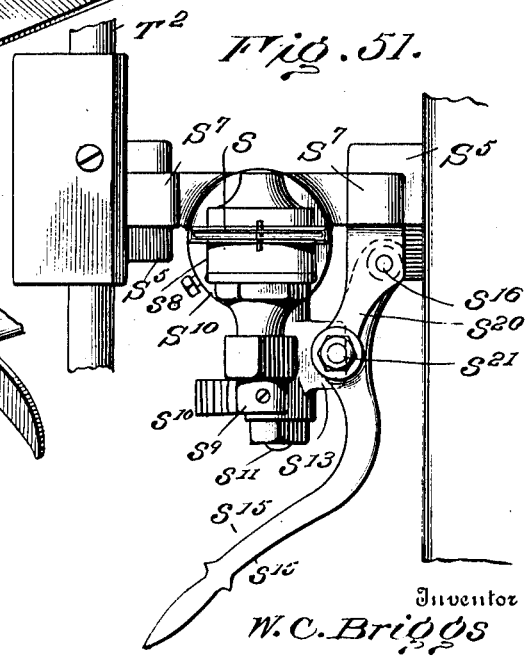
Inventor
W. C. Briggs
by his Attorneys
Baldwin Wight

UNITED STATES PATENT OFFICE.

WILLIAM C. BRIGGS, OF WINSTON SALEM, NORTH CAROLINA, ASSIGNOR TO CAROLINA BANDING MACHINE COMPANY, A CORPORATION OF NORTH CAROLINA.

MACHINE FOR APPLYING BANDS, LABELS, OR WRAPPERS TO CIGARS OR OTHER ARTICLES.

1,004,141. Specification of Letters Patent. Patented Sept. 26, 1911.

Application filed November 15, 1905. Serial No. 287,511.

*To all whom it may concern:*

Be it known that I, WILLIAM C. BRIGGS, a citizen of the United States, residing in Winston Salem, in the county of Forsyth and State of North Carolina, have invented certain new and useful Improvements in Machines for Applying Bands, Labels, or Wrappers to Cigars or other Articles, of which the following is a specification.

The primary object of my invention is to provide a machine for applying to cigars the small bands or labels often used, especially on the higher grades of cigars, but as will hereinafter appear the machine which I have produced for this purpose contains many features of construction which may be employed in machines for applying bands, labels, wrappers, or the like to bottles, cans, and many other articles or bundles of articles.

In the following specification I will, for convenience and simplicity, describe my improvements as being embodied in a cigar banding machine, it being understood, however, that without material change or with only slight modification the mechanism, or some parts thereof, may be made to operate on various articles.

Inasmuch as cigars differ in their characteristics from such articles as bottles, cans, and the like, some parts of the mechanism of my machine, which are especially designed for use when operating on cigars, are not suitable or necessary when dealing with other articles.

In my U. S. Patents No. 762,681 of June 14, 1904, and No. 764,707 of July 12, 1904, I have shown cigar-banding machines which are similar in many respects to the machine of my present invention. Some parts of the mechanism shown in those patents have merely been slightly changed or modified in my new machine, while others have been entirely reconstructed, my present improvements being designed to obtain increased speed and greater regularity in the operation and to obviate some imperfections in the prior mechanism.

In the machines of my former patents the labels or bands were printed on a strip or ribbon of indefinite length and this strip was severed into suitable lengths for banding the cigars. As the bands were fed to the wrapping devices paste was applied to one end of each band and the band was delivered upon the top of an endless wrapping tape. The cigars were fed by an endless carrier-chain or conveyer toward the wrapping mechanism and in the machine of the second mentioned patent were transferred from the carrier to the wrapping mechanism by devices which caused them to be delivered evenly and gently one at a time upon the top of the endless wrapping tape. Then the tape was slackened to form a pocket which received the cigar and then an endwise movement was given to the tape which caused the band to be wrapped around the cigar. According to my present invention, I feed the cigars toward the wrapping mechanism and deliver them thereto in much the same way as heretofore, but I have now provided certain devices for regulating the speed and adjusting the cigars in order that they may be delivered with greater uniformity. Instead of feeding the bands or labels from a strip or ribbon of indefinite length and applying paste thereto, I arrange previously gummed cut bands or labels in a pile within a magazine and feed them therefrom one at a time by novel devices to the wrapping mechanism which, while similar in some respects to that heretofore employed by me, differs therefrom in many important respects.

Among the important features of my new machine which may here be mentioned, are the devices which suspend the feeding of the cigars when they tend to crowd at the delivery end of the hopper; the devices for preventing the cigars from being crowded and crushed by the feeding mechanism; the devices for evening up the cigars endwise while being carried toward the wrapping mechanism; the means for holding and delivering the bands to the wrapping mechanism; the devices for holding the bands in the wrapping mechanism while the pockets are being formed therein; the novel mechanism for forming the pockets in the wrapping tapes and for giving an endwise movement to the tapes for rotating the cigars to wrap the bands around them, and the means for moistening the gummed bands just before they are wrapped.

There are many other features of my invention which will be best understood after a detailed consideration of the specification and drawings.

The subject-matter deemed novel and patentable is set forth in the claims.

Figure 1 is a perspective view of the machine. Fig. 2 shows a front elevation thereof. Fig. 3 shows a longitudinal section on the line 3—3 of Fig. 2. Figs. 4 and 5 are detail views of the mechanism for operating the exhaust pump which forms part of the band-feeding mechanism. Fig. 6 shows a longitudinal section on the line 6—6 of Fig. 2. Fig. 7 is a detail view in perspective of the mechanism for operating the cigar conveyer belt and pocketed drum. Fig. 8 is a detail view of part of this mechanism. Fig. 9 is a detail view of the pinion on the carrier-shaft which is operated by the segment shown in Fig. 7. Fig. 10 is a perspective view of a guard for controlling the ratchet mechanism of the drum shaft. Fig. 11 is a plan view of a portion of the delivery end of the hopper which contains the cigars to be banded. Fig. 12 shows a longitudinal section of the delivery end of the hopper and the mechanism therein on the line 12—12 of Fig. 13. Fig. 13 shows a vertical transverse section of the same on the line 13—13 of Fig. 12. Fig. 14 is a perspective view of a device for leveling the cigars in the pocketed feed drum. Figs. 15 and 16 are sectional views illustrating the mechanism for evening up endwise cigars of varying lengths. Fig. 17 is a perspective view of part of this mechanism. Fig. 18 is a sectional view thereof on the line 18—18 of Fig. 17. Fig. 19 is a perspective view of the two parts of one side of the cradle which receives the cigars from the carrier, conveys them to the wrapping mechanism and supports them while the pockets are being formed in the wrapping tapes. Fig. 20 is a view in longitudinal section of the cradle and parts associated therewith. Fig. 21 is a view on an enlarged scale and in vertical transverse section on the line 21—21 of Fig. 3 looking in the direction of the arrow. Fig. 22 is a view in vertical transverse section on the line 22—22 of Fig. 6 with some of the parts omitted. Fig. 23 is a view of the stationary cam which holds the pivoted arms of the wrapping mechanism closed after the cigars have been banded therein and which opens said arms to discharge the banded cigars and receive cigars to be banded. This figure also shows certain devices coöperating with the cam. Fig. 24 is a sectional view on the line 24—24 of Fig. 23. Fig. 25 is a detail view in vertical section of the moistening device. Fig. 26 shows a transverse section thereof on the line 26—26 of Fig. 25. Fig. 27 is a perspective view of the mechanism for closing the arms of the wrapping mechanism to form pockets in the wrapping tapes and to surround the cigars being banded.

Fig. 28 is a detail sectional view of one of the spring actuated spools on which the wrapping tape is wound. Fig. 29 is a detail view of the wrapping mechanism. Fig. 30 is a detail view in perspective showing various parts of the wrapping mechanism and illustrating how the wrapping tape is supported, guided and actuated. Fig. 31 illustrates how the pocket is formed in the wrapping tape. Fig. 32 is a detail view in section on the line 32—32 of Fig. 28, of the spring actuated spool on which the wrapping tape is wound. Figs. 33, 34 and 35 are diagrams illustrating how the cigars are conveyed from the pocketed feed drum to the cradle and thence to the wrapping mechanism. Fig. 35 also illustrates how the cement or paste on the bands is moistened just prior to the final wrapping of the bands. Fig. 36 is another diagram illustrating how the wrapping mechanism is actuated to discharge banded cigars and to receive cigars to be banded, how the bands are held while the pockets are being formed and how the bands are moistened at the proper time. Fig. 37 is a detail view of the clamp for holding one end of the band after it has been fed to the wrapping tape and while the pocket is being formed. Fig. 38 is a perspective view of the cradle and the band clamp. Fig. 39 is a perspective view of the magazine for containing the supply of bands and the mechanism for taking individual bands therefrom and delivering them to the wrapping mechanism. Figs. 40 and 41 are detail views in section of the gripping jaws which engage the individual bands and hold them while being transferred from the magazine to the wrapping mechanism. Fig. 42 is a detail view of one of the gripping jaws. Fig. 43 shows in elevation the magazine for the bands and the pneumatic mechanism for taking individual bands from the magazine. Fig. 44 shows in vertical section the mechanism for withdrawing bands individually from the magazine and conveying them to the wrapping mechanism. Fig. 44[a] is a detail view showing an adjustment of the band magazine. Fig. 45 shows a vertical central section on the line 45—45 of Fig. 43, and it will be observed that the parts in Figs. 44 and 45 are in different positions. Fig. 46 is a detail view of part of the mechanism for adjusting the side plates forming part of the mechanism for conveying the cigars from the hopper to the wrapping mechanism. Fig. 47 is a detail view in section of the guide bar for the band conveying devices and which is provided with means for exerting a friction on part of the mechanism at certain times. Figs. 48 and 49 are perspective views of the plates to which the band gripping jaws are connected. Fig. 50 is a perspective view of the upper end or mouth of a modified form of suction or exhaust mechanism which withdraws bands individually from the band magazine. Fig. 51 is another view in plan of the pneumatic mechanism for withdrawing bands from the magazine. Fig. 52 is a perspective view of the devices employed for guiding the banded cigars while they are being discharged from the wrapping mechanism.

The main frame, A, of the machine may be of any construction suitable to support the mechanism and many parts of the mechanism have bearings therein. The general form of the main frame is clearly indicated in the drawings and need not be specifically described except when necessary to indicate the relation of some of the parts hereinafter specified.

To the top of the lower or main frame I attach an upper frame, B, which supports trays, C, that are adapted to contain quantities of cigars to be banded. On the upper frame B, I mount a hopper, D, which is similar in many respects to that shown in my patents before mentioned. It comprises side plates, D', having braced flanges, $d$, bolted to the casting, B, a rear end plate, $D^2$, having an adjustable gate, $D^3$, and a front end piece, $D^4$, having a vertically adjustable plate or gate, $D^5$. Within the hopper and parallel with the side plates, D', thereof are arranged laterally adjustable plates, E, E', which extend from the rear end of the hopper to the front end thereof and are adjusted laterally by suitable devices in an obvious manner, that is to say, the plates are provided with arms, $e'$, that extend through bosses, $e^2$, on the sides plates, D' and set screws, $e^3$, in the bosses engage the arms and hold them tightly. In this way the plates may be adjusted in the hopper to conform approximately to the lengths of the cigars being operated upon and the cigars will thus be held substantially in the same relative position in the hopper with their ends substantially in line with each other.

In the lower portion of the hopper is arranged an endless flexible carrier or feed-belt, F, which extends from the rear of the hopper to the front portion thereof over pulleys, F' $F^2$. The pulley, F', is mounted on a shaft having stationary bearings, while the bearings of the pulley, $F^2$, are adjustable as indicated in Fig. 6. This adjustment may be effected in various ways. As shown, the axle, $f$, of the pulley, $F^2$, is supported by arms, $f'$, projecting rearwardly from a crosshead, $f^2$, and against this cross-head screws, $f^3$, bear, these screws being arranged in threaded lugs $f^4$, depending from a table, $F^5$, arranged below the upper turn of the belt, F. By these devices the belt may be stretched or may be allowed to relax. The shaft, $F^3$, of the front pulley, F', carries at one end outside the hopper a ratchet wheel, G, with which engages a pawl, $g$, on a pin, $g'$, carried by an arm, $g^2$, mounted to turn on the shaft, $F^3$. The pin, $g'$, is connected by a link or connecting rod, G', with a pin, $g^3$, which carries a pawl, $g^4$, and is connected with an oscillating lever, $G^2$, mounted to turn on the shaft, H, of the pocketed cigar feeding drum and which is joined by a connecting rod, $G^3$, with a vertically oscillating lever, $G^4$, operated in the manner hereinafter described. It is sufficient for the present to say that this lever, $G^4$, is oscillated vertically in such manner as to oscillate the lever, $G^2$ to operate the pawls, $g$, $g^4$, to drive the ratchet wheels with which they engage. The manner in which the pocketed cigar feeding drum operates will be hereinafter described more fully but it may be said now that it is actuated step by step continuously. A stationary shield or guard, $G^5$, is employed to control the engagement of the pawl, $g^4$, with the ratchet wheel, H', that drives the pocketed cigar feeding drum.

In the ordinary operation of the machine, the ratchet wheel, G, is driven step by step regularly without intermission, but if the cigars become crowded in the delivery end of the hopper it is desirable to suspend the operation of the conveyer, F, until this choking or crowding is removed. For this purpose I provide a shield, $G^6$, extending from a hub, $g^5$, on the shaft, $F^3$. This shield or guard, $G^6$, extends over a portion of the ratchet wheel as indicated in Fig. 7 and the hub, $g^5$, is formed with an arm, $g^6$, connected by a rod, $g^7$, with an arm, $g^8$, secured to a rod, $g^9$, which extends through bearings in a bracket, $G^9$, on one side of the hopper. The opposite end of the rod, $g^9$, is secured to a bent rod, $G^{10}$, to which is attached a rod, $G^{11}$, extending transversely across the central portion of the hopper and carrying a wide rimmed wheel, $G^{12}$, which is adapted to bear on the cigars in the hopper. An arm, $g^{11}$, extends from the shaft, $g^9$, in an opposite direction to that of the arm, $G^{10}$, and carries a weight, $G^{13}$, which counterbalances the weight of the wheel, $G^{12}$. The organization is such that normally the shield or guard, $G^6$, is held in such position as to allow the pawl, $g$, to operate the ratchet wheel, G, step by step to cause the conveyer, F, to feed the cigars at a regular speed toward the delivery end of the hopper; but should the cigars crowd or back up to too great an extent at the delivery end of the hopper, the wheel, $G^{12}$, will be raised and the guard, $G^6$, will be moved in such manner as to assume a position beneath the pawl that will prevent it from engaging its ratchet wheel for a time or will cause the pawl to engage each successive tooth of the ratchet wheel instead of moving the wheel forward two or three teeth at a time as it might be arranged to do in the normal operation of the mechanism. It will thus be seen that I have provided mechanism by which the supply of cigars by the endless conveyer to the pocketed cigar-feeding drum may be automatically regulated.

The conveyer, it will be observed, is provided with cross-pieces, $F^6$, which move the cigars along toward the drum, I, and in order that the cigars may be properly guided from the conveyer to the drum, I employ a plate, J, which spans the spaces between the front end of the conveyer and the drum. This plate is attached at, $j$, to the front ends of the table, $F^5$, and is illustrated particularly in Figs. 6, 11 and 12. The plate is cut away as illustrated to allow the conveyer to move and it is formed with fingers, $j'$, which project rearwardly and are adapted to enter the recesses, $d^5$, formed in the cross-pieces, $F^6$, of the conveyer. In this way the cigars are taken from the conveyer and conveyed to the pocketed drum without danger of any of them being jammed between the conveyer and the drum, or between the rear end of the plate and the conveyer. As the cigars are usually tapered there is some danger of their being drawn in at their tapered ends in such manner as to be crushed, but the device which I employ entirely prevents this.

The cigar-feeding drum, I, is secured to the shaft, H, and is formed on its periphery with a series of pockets, $i$, adapted to receive the cigars individually in the manner shown in Figs. 12 and 13. This drum is driven by means of the ratchet wheel, $H'$, shown in Fig. 7 and before referred to. It will be understood that the drum is advanced step by step in the direction indicated by the arrow in Fig. 12, and conveys the cigars in the pockets upwardly and delivers them in the manner hereinafter described. In order to prevent the drum from moving except when positively actuated by its driving mechanism a leather washer, $i^3$, is held against the bearing-boss, $i^4$, of the shaft, H, by a disk, $i^5$, secured to the end of the shaft.

The plates, E, E', extend upwardly on opposite sides of the drum, I, as shown in Fig. 11 and terminate at the front end piece, $D^4$. Plates, K, shown by dotted lines in Fig. 12 and in section in Fig. 13 extend upwardly from the front end of the plate, J, on opposite sides of the feed drum and terminate in front of the end plate, $D^4$, as shown in Fig. 1 and also in Fig. 12. In this way the bottom of the hopper is closed on opposite sides of the feed drum. The adjustable plate or gate, $D^5$, may be set so that while the cigars may freely pass out underneath the plate, $D^4$, while in the pockets, $i$, no cigars other than those properly arranged in the pockets can escape from the hopper.

The cigars should be held in a truly horizontal or level position while being conveyed by the feed drum. Inasmuch as some cigars are tapered more than others, it is advisable to employ some means for supporting the tapered ends of the cigars while in the pockets. For this purpose I employ a curved arm, L, shown in perspective in Fig. 14, and also clearly illustrated in Figs. 12 and 13. This arm projects upwardly from a base, L', which is connected with the hopper in such manner that it may be adjusted. As shown, the arm, L, projects into an annular groove, $l$, formed in the drum, I, in such manner as to not interfere with the rotation of the drum, but also in such manner that it may project into the pockets and support the tapered ends of cigars while they pass from the plate, J, to the front or delivery end of the hopper. Preferably the base, L', is attached to the side of the hopper by a screw, $l$, extending through a slot, $l^2$, in the base and by a screw, $l^3$, projecting vertically through a hole, $l^4$, in the base, L'. By this device the arm, L, can be properly adjusted.

The front portion of the pocketed cigar-feeding drum is contained between forwardly projecting portions of the sides, D', of the hopper and between these front side portions is located a plate, $D^6$, which is formed with downwardly projecting fingers, $D^7$, arranged between vertical plates, M, which have laterally projecting base portions, M', resting on the front shelf, $A^2$, of the main frame. The base portions, M', are slotted at $m$ and have downwardly projecting flanges, $m^6$, one of which in each plate has a rack, $m'$, (Fig. 1) with which engages a pinion, $m^2$, (Fig. 46) on a shaft, $m^3$, provided at its upper end with a knob or handle, $m^4$. The shaft, $m^3$, extends through a nut, $m^5$, which bears on the top of the base plate, M'. The shelf, $A^2$, is recessed at, $a^2$, to receive the flanges, $m^6$. By these arrangements the plates, M, may be adjusted toward and from each other to vary the distance between them. This adjustment is accomplished by loosening the nuts, $m^5$, and turning the knobs, $m^4$, in the proper direction, and by reason of the engagement of the pinions, $m^2$, with the racks, $m'$, the plates will be moved in the proper direction. After the proper adjustment has been made the nuts, $m^5$, may be tightened to hold the parts in their adjusted positions. Preferably both plates, M, are made adjustable in the manner just explained.

A horizontal shaft, N, mounted in bearings in the front portions of the sides, D', of the hopper carries hooks or catches, N', similar to those shown in my patent of July 12, 1904, above referred to. A spring, $N^2$, secured to the shaft and to the adjacent side, D', tends to move the shaft in one direction, that is, in a direction to move the hooks, N', forward. The shaft is moved in an opposite direction by devices hereinafter described. The shaft carries an arm, $n$, that engages a stationary stop, $n'$, when the shaft is moved to turn the hooks forward. Immediately below the hooks, $N'$, is a carrier, O, which is also similar in general construction and operation to that shown in my patent of July 12, 1904. The shaft, $O'$, of this carrier extends through the plates, M, and is mounted in suitable bearings as illustrated particularly in Fig. 22. It carries a pinion, $o$, engaged by the segment of teeth, $o'$, on the lever, $G^2$. (See Figs. 3 and 7). The shaft, $O'$, extends through nuts, $O^2$, $O^3$, which are formed with opposite screw-threads and engage the plates, M, in the manner indicated in Fig. 15. The shaft, $O'$, has a tongue and groove connection with the nuts, which latter are adapted to revolve with the shaft, and they are adapted also to move endwise toward and from each other to a limited extent. A pocketed arm, $O^4$, is rigidly secured to the shaft, $O'$, midway between the plates, M, as clearly illustrated in Fig. 15. Similar pocketed arms, $O^5$, $O^6$, are secured to the nuts, $O^2$ and $O^3$. These pocketed arms receive cigars one at a time from the hooks or catches, $N'$, in a manner hereinafter more particularly explained.

In rear of the carrier to the inside of each plate, M, is secured a guide plate, $O^7$. (See Figs. 6 and 15). These guide plates have curved portions, $o^7$, in rear of the carrier and when a cigar is being conveyed by the carrier the guides serve to retain the cigars therein.

To the nut, $O^3$, is attached a plate, $O^8$, which provides an abutment for the flat ends of the cigars. A plate, $O^9$, is carried by the nut, $O^2$, but this plate is adjustable in the manner indicated. It is so mounted on the nut, $O^2$ that it may slide endwise thereon to a limited extent but is normally pressed toward the adjacent arm $O^5$, in the manner indicated.

It will be observed, by reference to Figs. 17 and 18, that the plate, $O^9$, is connected with pins, $o^9$, $o^{10}$. The pin $o^9$, is merely a guide pin and is adapted to slide freely in the pocketed arm, $O^5$. The pin, $o^{10}$, also slides in the pocketed arm, but it extends also into a casing, $o^{11}$, within which is a spiral spring, $o^{12}$, that bears against the arm, $O^5$, and also against the head, $o^{13}$, of the pin. The arrangement is such that when the nut, $O^2$, is moved to cause the pocketed arm, $O^5$, to approach the arm, $O^4$, the plate, $O^9$, will move with it, but should the plate meet an obstruction such as a cigar, X, as indicated in Fig. 15, it will yield so as not to crush the cigar but sufficient force will be imparted to move the cigar endwise up against the plate, $O^8$. By these means the cigars are made to aline at their outer or flat ends, even though they vary in length. Recesses, $o^{14}$, are formed in the guides, $O^7$, to accommodate the plates, $O^8$, $O^9$. By adjusting the plates, M, the carrier-arms may be arranged to receive cigars of approximately the same length, while the spring plate, $O^9$, provides an automatic adjustment to accommodate slight variations in the lengths of cigars.

The shaft, $O'$, of the carrier has secured to its left hand end an arm, $N^5$, which is adapted to engage an arm, $N^6$, depending from the shaft, N, that carries the hooks or catches, $N'$. The arrangement is such that as the shaft, $O'$, oscillates the arm, $N^5$, thereon will at the proper times cause the shaft, N, to be turned to move the hooks rearward. They are moved in the opposite direction by the spring, $N^2$, in the manner before described. When the cigars leave the drum, I, they pass down behind the fingers, $D^7$, and drop into the hooks when the parts are in the position shown in Fig. 6, the hooks then being in their rearmost position, but as soon as the hooks are moved forward the cigars are stripped from them by the stationary fingers, $D^7$, and they pass into the carrier, O. The carrier conveys the cigars to the cradle, P, which is also similar in most respects to that shown in my patent of July 12, 1904. It is shown in perspective in Fig. 38. The upper arms, $p$, of the cradle are rigidly secured to the shaft, $P'$, while the lower arms, $p'$, are loose thereon. The shaft, $P'$, extends through suitable bearings in the frame and carries a pinion, $P^2$, which is engaged by a segment of teeth, $P^3$, on a lever, $P^4$, (Fig. 3) which is oscillated in a manner hereinafter described. As shown in Fig. 20, the upper arms, $p$, of the cradle are pinned to the shaft, $P'$, while the hubs, $p^2$, of the lower arms, $p'$, embrace the hubs, $p^3$, of the upper arms, $p$. The portions, $p^4$, of the arms, $p$, (Figs. 19 and 38) extend through slots, $p^5$, in the hubs of the arms, $p'$, therefore the arms, $p$, have a movement independent of the arms, $p'$. At first the arms, $p$, move while the arms, $p'$, remain stationary and thereafter the arms, $p$, and $p'$, move together.

In Fig. 20, devices are shown for producing a friction on the hubs, $p^2$, of the arms, $p'$, so that they will not move except when positively moved by the arms, $p$. Various devices may be employed for producing this friction, but as shown, pieces of leather, $p^6$, are made to bear on the hubs, $p^2$, and plates, $p^7$, bear on the leather, while springs, $p^8$, bear on the plates. By means of screws, $p^9$, the tension may be varied to regulate the friction. The plates, $p^7$, are attached to stationary parts, $a^{10}$, of the frame.

The shaft, $P'$, is so operated as to oscillate the cradle in such manner that it will rise to the position shown in Fig. 6 to receive a cigar from the carrier and then move downwardly in a curved path to deliver the cigar to the wrapping mechanism. This wrapping mechanism will be hereinafter described after a description of the band-feeding mechanism. I will first, however, call attention to the band clamp, Q, the function of which is to clamp the band on the wrapping tape while the pocket is being formed and the band is being turned around the cigar. This clamping device comprises a hub, $q$, a clamping finger, $q'$, and a stop, $q^2$. The hub is hollow and embraces a collar, $q^3$, pinned to the shaft, P', as shown in Fig. 20. Between the collar and the hub is interposed a leather washer, $q^4$, for producing a friction, and the hub and washer are moved toward the collar, $q^3$, by a spring, $q^5$, encircling the shaft, P', and bearing against one of the cradle arms. The arrangement is such that when the shaft, P', is turned the band clamp, Q, will be turned with it, but when any obstruction or stop is encountered the shaft, P', can be moved without moving the clamp. The friction, however, is sufficient to enable the clamp to firmly engage the band and prevent it from moving while so engaged. When the band clamp moves from the position shown in Fig. 33 to that shown in Fig. 34, it follows the movement of the shaft, P', but when it encounters the band and the wrapping devices, the friction devices, before described, permit the shaft, P', to move farther without moving the clamp. The movement of the clamp in the opposite direction is limited by means of the set screw or stop, $q^2$.

I will next describe the mechanism for feeding the bands to the wrapping mechanism.

In the machines of my prior patents the bands were printed on a strip or ribbon of indefinite length, and paste was applied to them while they were being delivered to the wrapping mechanism, but it is difficult to prevent paste from being smeared on the mechanism, and I have found it more desirable to employ bands which are cut to the proper length and have a small portion of cement, glue or other suitable adhesive applied to one end and dried and to store such bands in a magazine from which they are taken one at a time and transferred to the wrapping mechanism before the cigars are delivered thereto. The magazine, R, for the bands is located at the front right hand side of the machine in a depressed portion of the main frame. It is shown as consisting of two upright guides, R', adjustably secured to a stationary part of the machine. Each portion, $r$, of each guide is flanged at $r'$, while the other portion, $r^2$, is adjustable by means of adjusting devices, $r^3$, so as to vary the size of the channel in the magazine to accommodate bands of different widths. The manner of effecting this adjustment is so clearly shown in the drawings that it need not be further described. In this way bands of different sizes and shapes may be accommodated and preferably the portion, $r$, of each band guide is so attached to the main frame that it may be shifted in such manner as to hold the bands in an inclined position so that they may be delivered to the wrapping mechanism in an inclined position to accommodate cigars that are very much tapered. By reference to Fig. 44$^a$, it will be observed that the guide, R', has its base slotted. The adjustment, for the purpose of holding the band in an inclined position relatively to the line of feed, need only be a very slight one and the slotted guide may be turned to a very slight extent about the axis of the pivot screw as a center. This will shift the bands slightly so as to hold them at a slight angle to the line of feed. The portions, $r^2$, of the guides being adjustable, may be properly set to accommodate the inclined positions of the bands. For this purpose the base of one of the uprights is slotted as indicated in Fig. 44$^a$. When so constructed the magazine may also be adjusted to accommodate bands of different lengths. It will be understood that the bands are piled one upon another in the magazine, and rest on pins, $r^4$, and on opposite sides of the magazine below the pins, I provide retarding devices, R$^3$. Each of these is shown as consisting of an arm, $r^5$, attached to a stationary part of the frame and carrying a vertical plate, $r^6$, formed with saw-teeth, $r^7$. These saw-teeth do not normally engage the pile of bands in the magazine being located below it, but when a band is being withdrawn by the pneumatic withdrawing device presently described, should more than one band follow this device those not in direct contact or engagement with the device or adhering thereto will be caught by the teeth and held between the retarding devices. Thus only one band at a time can possibly be entirely withdrawn from the supply. As the withdrawing device again rises the bands held by the teeth are raised and as the device again lowers with a band adhering to it other bands are caught by the teeth in a similar way should they tend to leave the magazine.

In order to draw the bands from the magazine, I preferably employ a pneumatic withdrawing device. The head or mouth, $s$, of this withdrawing device is preferably elongated and divided as shown, and adapted to operate upon the middle portion of the bottom band in the pile. When it is elevated in the position shown in Fig. 45 it presses against the pile of bands and lifts them, at this time air is exhausted, the lower band in the pile adheres to the withdrawing device and recedes with it when it is moved downward, the other bands in the pile which tend to follow the lower band being arrested by the retarding devices, $R^3$, and by the pins, $r^4$. When the withdrawing device descends the opposite ends of the bottom band are bent or curved upwardly so as to pass the pins, $r^4$.

The mouth, $s$, of the withdrawing device communicates by means of an orifice, $s'$, with a valve chamber, $s^2$, containing a rotary valve, $s^3$, having a spring actuated reciprocating member, $s^4$. The valve chamber communicates by means of a passage, $s^5$, with the flexible tube, $s^6$, which in turn communicates with a chamber, $S^4$, from which air is exhausted by means of an exhaust pump, $S^2$, as hereinafter described. The exhaust pump communicates with the exhaust chamber, $S^4$, by means of a flexible tube, $S^3$, as shown in Fig. 3. The casing, $s^8$, has secured to it a collar, $S^{10}$, carrying wings or slides, $S^7$, that move vertically in guides, $S^5$, in the frame, and said casing is also connected with a yoke, $S^6$, that embraces a shaft, $S^8$, driven from the main or power shaft, $A^{30}$, by suitable gearing, such as that indicated at, $b$ in Fig. 21. The shaft, $S^8$, carries a cam wheel, $B^2$, having a cam, $b^2$, with which a roller, $b^3$, carried by the yoke engages, the arrangement being such that as the shaft, $S^8$, continuously revolves, the yoke will be raised and lowered and will correspondingly raise and lower the band withdrawing device at regular intervals. The valve, $s^3$, is attached to a valve-rod, $s^7$, on the outer end of which is a pinion, $s^9$, which meshes with a segment of teeth, $s^{10}$, on a short shaft or rod, $s^{11}$, attached to an arm, $s^{12}$, formed on the collar, $S^{10}$. The segment, $s^{10}$, has a laterally projecting arm, $s^{13}$, shown in Fig. 43 which at times is adapted to engage an adjustable stop-screw, $s^{14}$, and at other times is adapted to engage the under side of a lever, $s^{15}$, shown in section in Fig. 43. As the withdrawing device is raised and lowered by its cam the arm, $s^{13}$, will alternately engage the stop, $s^{14}$, and the lever, $s^{15}$, and thus the valve, $s^3$, will open and close communication between the mouth of the withdrawing device and the exhaust. As shown in Fig. 45 the parts are elevated and the exhaust is opened, but when the mechanism is lowered the arm, $s^{13}$, engages the stop, $s^{14}$, and the valve is turned to shut off communication between the withdrawing device and the exhaust chamber. The lever, $s^{15}$, is pivoted at $s^{16}$, to the stationary frame, and it is pressed upon by a spring, $s^{17}$, carried by a bracket, $s^{18}$, so that it will remain in the position to which it is set. In Fig. 43 the lever is in position to engage the arm, $s^{13}$, and thus open the valve, but the lever may be turned over to one side out of the way of the arm, $s^{13}$, so that when the mechanism rises the exhaust will not operate to withdraw a band. In this way the machine may be run if desired without withdrawing bands. A bracket arm, $s^{20}$, projects from the frame to a point over the arm, $s^{13}$, and carries a set-screw, $s^{21}$, which bears on the top of the lever when the latter is in operation.

After a band has been withdrawn from the magazine by the pneumatic withdrawing devices, it is seized by grippers which convey it to the wrapping mechanism. For this purpose, I employ gripping jaws which are constructed and operated in the manner shown particularly in Figs. 39 to 44 inclusive. The stationary gripping jaws, $t$, project from a plate, T, and the movable gripping jaws, $t'$, are attached to a rod, $t^2$, mounted in bearings on a plate, T'. The plate, T', rests on the plate, T, and the outer ends of the gripping jaws when gripping are arranged over the outer ends of the stationary gripping jaws, as illustrated in Fig. 41. The tails, $t^3$, of the movable gripping jaws project through slots, $t^4$, in the plate, T, just in rear of the stationary jaws, $t$, and are adapted to move endwise therein. When the plate, T', is moved to the left as viewed in Fig. 39, or in Fig. 1, the tails, $t^3$, of the movable jaws will move along the slots and will strike the ends, $t^5$, thereof and will cause the movable jaws to be lowered in the manner indicated in Fig. 41. It will be understood that the plate, T', moves for a time relatively to the plate, T. Thereafter the plates are moved together in the manner presently described. The plate, T, on one side, that is to say the front side, as indicated in Fig. 1 is guided by a guide bar, $T^2$. This bar is slotted to receive the edge of the plate, T, and extends from the band magazine to a point near the wrapping devices. Within its opposite ends it is provided with friction devices, $t^7$, which may be pieces of spring steel secured in the manner indicated, and which tend to retard the movements of the plate, T, and do so retard it while the plate, T', is moving relatively to the plate, T, to operate the gripping jaws. The plate, T, carries a guide, $T^3$, for the front edge of the plate, T', and the opposite or rear edge of the plate, T, rests on a plate, $T^4$, attached to the slide, $T^5$, to which the rear edge of the plate, T', is firmly secured in the manner clearly shown in Fig. 39. The shaft, $t^2$, carries an arm $t^{10}$, with which engages a spring, $t^{11}$, secured to the plate, T'. This spring tends to elevate the movable jaws, $t'$. As soon as the tails, $t^3$, of the jaws recede from the ends, $t^5$, of the slots, the spring elevates the jaws to the proper extent. The slide, $T^5$, reciprocates horizontally in guides, $T^6$, clearly shown in Figs. 39 and 44 and carries the jaws back and forth between the band magazine and the wrapping mechanism.

The slide has secured to it an arm, $T^7$, which is connected by a link, $T^8$, with the upper end of a lever, $T^9$, which is pivoted at, $T^{10}$, in a stationary frame and has an arm, $T^{11}$, carrying a roller, $T^{12}$, engaging a cam groove in the cam wheel, $B^2$. This groove is suitably shaped to operate the lever, $T^9$, in such manner as to reciprocate the gripping jaws at the proper time to carry bands to the wrapping mechanism. After a band has been withdrawn from the magazine by the pneumatic withdrawing devices, the gripping jaws in an open condition, such as indicated in Fig. 40, move to the left and then close upon a band, Y, as indicated in Fig. 41 just after the exhaust mechanism has been cut off and the withdrawing mechanism has dropped to a position below the plane of plates, T, T'. The jaws continue their movement to the left and carry the band to the wrapping mechanism in the manner indicated in Fig. 44. When the slide, to which the plate, T', is rigidly secured, reaches the end of its guide, $T^6$, and commences to recede, the plate, T', first moves while the plate, T, remains stationary being held by the friction devices, $t^7$. As soon as the plate, T', has moved to a short extent the movable jaws will be raised by the spring, $t^{11}$, and thus the band will be released. As soon as the tails, $t^3$, of the jaws strike the ends, $t^6$, of the slots, the plate, T, will be connected with the plate, T', and both plates will recede together. Preferably the engaging ends of the movable jaws are constructed as indicated in Figs. 40, 41 and 42 being provided with plates, $t^{13}$, of rubber or similar material which will enable the jaws to take a firm hold on the band without danger of slipping.

The main or power shaft, $A^{30}$, is mounted in suitable bearings in the main frame, which as shown, is provided with a web, $A^3$, which supports the bearings of some of the mechanism. A hand wheel, $A^4$, is applied to one end of the power shaft while fast and loose pulleys, $A^5$, are applied to the opposite end. A belt shifter, $A^6$, may be employed for starting and stopping the machine. This belt shifter is operated by a rod, $A^7$, having a knob or handle, $A^8$. The power shaft carries a pinion, $A^9$, (Fig. 6) gearing with a spur-wheel, $A^{10}$, on a shaft, $A^{11}$, and it carries another pinion, $A^{12}$, meshing with a spur-wheel, $A^{13}$, provided with a crank pin, $a^{13}$, (see Fig. 5), which engages a slot, $a^{14}$, in a lever, $A^{14}$, pivoted to a bracket, $A^{15}$, of the main frame and engaging at $a^{15}$, the vertical rod, $a^{16}$, of the exhaust pump, $S^2$, which may be of any suitable construction, the arrangement being such that as the spur-wheel, $A^{13}$, revolves a reciprocating movement is given to the pump rod to operate it in such manner as to produce a vacuum in the exhaust chamber, $S^4$, which as before stated, is connected with the pneumatic withdrawing devices for taking bands from the band magazine.

The shaft, $A^{11}$, carries a cam, $P^6$, with which engages a roller, $P^7$, on the lever, $P^4$, that operates the cradle shaft. The cam is so shaped as to oscillate the cradle at the proper times to receive cigars from the cigar-feed mechanism and to deliver them to the wrapping mechanism in the manner before explained. The shaft, $A^{11}$, also carries an eccentric, $A^{17}$, which engages an eccentric strap, $A^{18}$, having an arm, $A^{19}$, jointed to the lever, $G^4$, hereinbefore referred to and which, as before explained, operates the endless conveyer in the hopper and the pocketed cigar-feeding drum as well as the carrier, O, through the instrumentality of the segment lever, $G^2$. To the front end of the lever, $G^4$, is jointed a link or connecting rod, $A^{20}$, which in turn is jointed at its lower end to an arm, $A^{21}$, on a shaft, $A^{22}$, which carries a ratchet wheel, $A^{23}$, with which engages a pawl, $A^{24}$, carried by an arm, $a^{25}$, fast on the shaft, $A^{22}$. As the lever, $G^4$, is oscillated a step by step movement is given to the shaft, $A^{22}$. This shaft, as shown in Fig. 6, carries a pinion, $A^{25}$, which meshes with gearing on an annular frame, U, (Fig. 21) carrying the wrapping mechanism. As the pinion, $A^{25}$, revolves step by step the frame, U, is revolved step by step at proper intervals. The annular frame, U, is supported in a circular stationary cam plate, U', (see Fig. 21). This cam plate is secured to a stationary plate $U^2$, and it is formed to receive the frame, U, which latter is held in place by a ring, $U^3$, attached to the cam plate, U'. The connection is such, as is clear from Fig. 21, that the annular frame, U, can revolve about the cam plate, U'. The frame, U, is provided with an annular series of pins, $u$, with which the pinion, $A^{25}$, engages. As the shaft, $A^{22}$, is rotated step by step a uniform step by step movement is given to the frame, U.

In Fig. 6 I have shown a pawl, $U^4$, which engages the pinion, $A^{25}$, and serves to prevent it from moving backward should it tend to do so when any pressure is applied to the frame, U, that would tend to move it improperly.

The cam plate, U', is illustrated more particularly in Fig. 23. It is provided with a track, $u^2$, which is concentric with the axis about which the carrier, U, moves for the greater part of its circumference, but it merges into an irregular cam-shaped portion, $u^3$, providing in connection with the flange, $u^4$, a cam groove, $u^5$, for a purpose hereinafter described.

The annular frame or carrier, U, supports wrapping devices which receive the bands of the cigars and cause the bands to be wrapped around the cigars. The frame, U, is formed with a series of radial arms, $U^5$, having bosses, $u^6$, through which extend the shafts, $U^6$, each of which shafts carries on its inner end an arm, $u^7$, provided with a roller, $u^8$, traveling on the guide flange or track, $u^2$, and in the guide groove, $u^5$. The hub, $u^9$, of each arm, $u^7$, is clamped to a shaft, $U^6$, and is provided with a lug, $u^{10}$, for a purpose hereinafter described. To the other end of each shaft, $U^6$, is rigidly attached a wrapping arm, V, and loosely mounted on each shaft, $U^6$, is a wrapping arm, V'. The long sleeves or hubs, $v$, of the wrapping arms, V', are rigidly connected with the bosses, $u^6$, in such manner that all the wrapping arms, V', are stationary at all times relatively to the carrier frame, U. The movable arms, V, are adapted to move about the axes of the shafts, $U^6$, in such manner as to cause their outer ends to move toward and from the outer ends of the stationary arms, V'. The arms, V, and V', of each set are provided on their outer ends with guides for a wrapping tape, $V^2$. The manner in which the tape is supported and guided in the outer ends of the arms is so clearly shown in the drawings that a detailed description is unnecessary. The wrapping tapes are wound on spools, W, containing springs, $w$. These spools have hubs, $w'$, mounted on arms, $w^2$, which extend outwardly from each alternate pin, $u$, in the annular series. The spools are free to revolve on the arms, $w^2$, except as controlled by the springs, $w$. It will be observed by reference to Fig. 6 that there is a wrapping tape for each set of wrapping arms and a spring spool for each tape. The outer end of each tape is attached to an arm, $V^3$, pivotally connected at $v^3$, to the frame, U, and having an arm, $v^4$, which is engaged by a pin, $v^5$, projecting from the movable arm, V, of the wrapping devices immediately following it. While the rollers, $u^8$, are traversing the concentric portion, $u^2$, of the track the wrapping arms are closed, but as soon as the rollers, $u^8$, enter the cam groove, $u^5$, the arms, V, are opened. While the roller, $u^8$, is traversing the cam groove, $u^5$, a previously banded cigar is ejected and a new band and cigar are received and inclosed by a wrapping tape. The cam groove, $u^5$, is for the purpose of opening the wrapping mechanism and for holding it open. In order to close the arms I provide an arm, $W^2$, secured to a shaft, $W^3$, and having a bent end, $w^4$, that is adapted to engage the lugs, $u^{10}$, on the hubs, $u^9$. The shaft, $W^3$, carries on its left hand end an arm, $W^4$, through the end of which extends a bolt, $w^5$, to which is secured an arm, $w^6$, connected by a spring, $w^7$, with a stationary part of the frame. The arm, $W^4$, or rather the head of the bolt, $w^5$, is engaged at times by an arm or lug, $w^8$, on the connecting rod, $A^{20}$, the arrangement being such that when the rod, $A^{20}$, moves downward the shaft, W, is actuated in such manner as to cause a wrapping arm, V, to be closed over from the position shown in Fig. 30 to that shown in Fig. 31. In Fig. 23 the lowermost of the wrapping arms is shown in a position as just about to leave the cam groove, $u^5$, and just about in position to be engaged by the arm, $W^2$. When it is thus operated the roller, $u^8$, is moved outward from the cam groove, $u^5$, and in line with the guide rail, $u^2$. In doing so it passes by a latch, Z, pivoted at $z$ to the cam plate, U', and pulled in one direction by a spring, $z'$, attached to the frame, $U^2$. As soon as the roller has passed by the latch the latter springs back into place and prevents the roller from again entering the cam groove, $u^5$. Soon after this the roller passes onto the track, $u^2$, and there is no danger of its falling back. Each of the rollers is similarly acted upon by the latch, Z, as it passes out of the cam groove.

As previously stated, each band has a small quantity of dried gum, paste or suitable adhesive material on one end, and it is necessary to moisten this material before the end of the band containing it is drawn into the wrapping devices. For the purpose of thus moistening the gummed end of the band, I provide moistening devices, $Z^5$, shown as consisting of a reservoir, $z^5$, containing absorbent material, $z^6$. The mouth of the receptacle is closed by a pad, $z^7$, of felt or similar material and over this is arranged a piece of cloth, $z^8$. The mouth of the receptacle is so closed as to allow only a small quantity of moisture to exude through the material at its mouth, there being just sufficient to dissolve or moisten the adhesive material on the band. Pivotally connected with the reservoir, $z^5$, is a lever, $Z^6$, which operates to press the gummed end of the band against the moistener. As shown in Fig. 26 the end of this lever is curved in cross section so that the moisture may be applied principally in the middle portion of the adhesive material and will not spread over the sides of the bands. The reservoir, $z^5$, is supplied with water through a pipe, $Z^7$, which connects with a water reservoir, $Z^8$, provided with a cock, $z^8$, which allows only a small quantity at a time to pass through the pipe to the moistener. The chamber, $z^5$, is secured to a shaft, $Z^9$, (Fig. 22) mounted in suitable bearings in the frame and carrying at its outer end a segment of teeth, $z^9$, engaged by a segment of teeth on a lever, $Z^{10}$, (Fig. 3) pulled in one direction by a spring, $z^{11}$, and operated in the opposite direction by the rollers, $u^8$, in the manner indicated in Fig. 36. The arrangement is such that the spring, $z^{11}$, tends to draw the moistener rapidly downward into engagement with the ends of the bands, but as the end, $z^{12}$, of the lever engages one of the rollers, $u^8$, the lever, $Z^{10}$, is operated to cause the moistener to recede out of the path of the ends of the bands. It will be understood that the lever, $Z^6$, is pivoted to swing freely while the reservoir, $Z^5$, is oscillated. As shown in Fig. 35, for instance, the reservoir, $Z^5$, is shown by dotted lines as moved away from the lever, $Z^6$. At this time the end of the band in the wrapping devices is projected across the depending end of the lever, $Z^6$, and when the reservoir is moved back to the position shown in full lines in Fig. 35, its end strikes against the band and presses it against the lever, $Z^6$, which being freely oscillating, yields at this time but nevertheless exerts sufficient force to cause the gummed end of the band to be thoroughly moistened.

The only part of the machine yet undescribed is that part which guides the banded cigars after they are ejected from the wrapping mechanism. These guides are illustrated in detail in Fig. 52 and are also shown in Fig. 6. The upper guides, $Z^{15}$, comprise brackets secured to the front portion of the main frame inside the latter and having curved arms $z^{15}$, which are connected by a rod, $z^{16}$, carrying a loosely swinging gate or retarding device, $Z^{16}$, which serves to prevent the cigars from being ejected at too high a speed. Below this gate are arms, $Z^{17}$, secured to a shaft or rod, $Z^{18}$, supported in suitable bearings on the main frame. The guiding arms are so shaped and arranged as to provide a guide channel, $Z^{19}$, between them which receives the ejected cigars and guides them through an opening, $Z^{20}$, in the main frame from which point they may pass to any suitable receptacle.

I have heretofore described various adjustments of different parts of the mechanism and I have also briefly indicated at various times the mode of operation of many of the parts so that it will not be necessary to describe the various adjustments, or in detail all of the various operations when describing the general operation of the machine.

A large quantity of cigars may be supported in the trays, C, from which the attendant can keep the hopper properly filled or supplied. The cigars in the hopper are moved toward the front of the machine step by step and are delivered to the pocketed cigar-feeding drum. Each pocket in the drum carries a cigar and no more than one cigar for each pocket is fed by this drum.

Referring now to Figs. 33, 34 and 35— as there shown the cigars are successively delivered from the pockets in the drum to the catches or hooks, N′, which at the proper times, release a cigar which drops gently into the carrier, O, the cigars in the carrier being automatically, in a manner before described, brought into proper alinement. The carrier gently delivers cigars one at a time to the cradle, P, and the cradle delivers cigars successively to the wrapping mechanism. The bands are supplied to the wrapping mechanism in advance of the cigars in a manner before described. As a band is deposited upon a stretched wrapping tape, the clamp, Q, which moves down with the cradle, engages it and holds it firmly. After a band is thus engaged by the clamp, Q, the jaws of the band-carrier release it and the band is held firmly on the tape until it is bent around the cigar. As the cradle further descends it carries with it a cigar and the movable wrapping arm, V, is swung about its axis while the band is still engaged by the clamp, and the band and cigar are inclosed in a pocket in the wrapping tape. It will be observed that the cradle descends with the cigar and supports it on opposite sides of the wrapping tape so that there is no danger of the cigar falling out on either side of the tape until after it is firmly grasped by the wrapping mechanism. After the wrapping arms have thus been brought together and the pocket is formed, the cradle rises and the band clamp is withdrawn with the cradle. The carrier, U, is then moved another step and the cigar in the pocket is elevated one step in the manner indicated in Fig. 35, then the movable wrapping arm immediately below it is turned on its pivot and in doing so causes the arm, $V^3$, to be actuated. This causes the wrapping tape to be drawn out from the spool and to rotate the cigar and band and thus securely wrap the band around the cigar. Just previous to this, however, the moistening devices are actuated to moisten the gummed end of the band so that when it is drawn into the wrapping mechanism it is caused to firmly adhere to that portion of the band which it overlaps. The operation of banding the cigar is thus complete and thereafter as the banded cigars travel around toward the discharge orifice of the machine they are at rest, but the gum has a chance to dry and thus by the time the cigars are ejected there is no danger of the bands springing loose. The wrapping mechanism is so constructed and operated that cigars of any size or shape may be banded. The tapes are narrow so as to surround only a small portion of the cigar, there being thus no tendency to move it endwise. The tape when stretched as shown in Fig. 33 is wide enough to receive a cigar of any diameter and when the wrapping arm closes the tape tightens up about the cigar so as to form a close pocket around it. Then when an endwise movement is given to the tape the cigar and the band are rotated until the band is properly applied. The spring spools insure that the tapes shall be properly stretched or held taut at all times.

In Fig. 33 a cigar is being held in the catches, N, while another cigar is being delivered to the cradle by the carrier. The wrapping devices carry a band and are open ready to receive a cigar from the cradle. In Fig. 34 a cigar is held in an elevated position by the carrier, while another cigar carried by the cradle is being deposited in the wrapping devices and at this time the lever, $V^3$, is being actuated by the pin, $v^5$, to draw out the tape of the wrapping devices immediately above it. In Fig. 35 the pocket in the lower set of wrapping devices is nearly formed, the band being still grasped at one end by the clamp, Q, while the other end of the band projects from the pocket ready to be engaged by the moistener. In the set of wrapping devices immediately above the one just referred to it will be observed that the clamp has been withdrawn while the gummed end of the band, after having been moistened, has been drawn into the pocket and at this time the wrapping tape is drawn out against the force of the spring to rotate the cigar and band.

In Fig. 36 the operation can be followed from the time when a cigar is ejected to the time when a new one is banded. At the point marked 1, the wrapping arm, V, is being opened to eject a banded cigar into the discharge guide $Z^{19}$, at the point marked, 2, the arm, V, of the wrapping mechanism is being opened to spread the wrapping tape. When the device at 2 has moved a little farther upwardly, it receives a band which is then clamped by the clamping device, Q. Then the cradle further descends with the cigar at which time the movable wrapping arm is turned so as to form the pocket around the cigar as it descends with the cradle in the manner indicated at 3. It will be observed that the clamp, Q, still engages the band, but as the upper arms of the cradle soon after this rise the clamp rises with them while the lower arms of the cradle wait until the devices indicated at 3 move farther toward the position indicated at 4 in which position the clamp and cradle are not shown, as the device at 4 has moved away from them. In passing from 3 to 4 the outwardly extending gummed end of the band has been moistened and the tape has been actuated to draw this end in and to rotate the cigar and band. When the devices reach the point 5, the cigar is completely banded, but in passing from 4 to 5 the tail, of the lever, $Z^{10}$, has been engaged by one of the rollers, $u^8$, and operated the moistening devices in such a manner as to cause them to move away from the path of the band, but immediately after they have thus moved they come back again and strike a band and moisten it.

It should be remembered that the wrapping devices advance step by step. As each wrapping device is presented to the cradle it stops until a cigar has been deposited therein and thereafter advances.

The mechanism is so timed that the different parts thereof operate harmoniously, and in proper order, cigars being ejected from the machine one at a time as fast as they are one at a time delivered thereto.

While the machine operates step by step, yet it can be operated at quite a high speed to do the work efficiently.

While I prefer to organize the mechanism in the manner illustrated and described, it will be understood that various changes therein may be made without departing from the novel features of my invention and that some parts of the mechanism may be used in machines constructed and organized differently from that herein shown.

As before stated, my improvements may be embodied in machines not only for applying bands to cigars, but for applying bands, labels or wrappers to bottles and various other articles, and where in the claims I mention cigars, or bands for cigars, I wish it to be understood that I do not specifically confine myself to bands for cigars, but wish also to be understood to include bands, labels or wrappers for other articles.

I claim:—

1. A cigar banding machine comprising means for feeding the cigars one at a time, means for evening the cigars endwise while being fed, means for feeding gummed bands one at a time, a rotary carrier provided with a series of wrapping arms and wrapping tapes, means for clamping the bands on the tapes, means for opening and closing the arms, means for moistening the gummed ends of the bands, and means for moving the tapes endwise.

2. Mechanism for feeding cigars or other articles to banding, labeling or wrapping mechanism, comprising a hopper provided with a feed belt having notched or recessed cross pieces, a pocketed feed drum revolving upwardly from the top surface of the feed belt, a plate interposed between the feed belt and the drum having fingers adapted to enter the notches or recesses in the cross pieces and serving to guide the cigars into the box, and a floating wheel above the plate for pressing cigars downwardly upon the plate.

3. Mechanism for feeding cigars or other articles to banding, labeling, or wrapping mechanism, comprising a hopper, a pocketed feed-drum revolving upwardly from the bottom of the hopper, and means for varying the depth of the pockets in the drum at one end.

4. Mechanism for feeding cigars or other articles to banding, labeling, or wrapping mechanism, comprising a hopper provided with a feed belt, a pocketed feed-drum receiving cigars or other articles from the feed-belt, and an adjustable arm in the feed-drum for varying the depth of the pockets at one end.

5. Mechanism for feeding cigars or other articles to banding, labeling, or wrapping mechanism, comprising a hopper, a feed-belt therein, a pocketed feed-drum receiving cigars or other articles from the feed-belt, ratchet mechanism for turning the drum step by step, ratchet mechanism for actuating the feed-belt step by step, and means controlled by the passage of articles from the feed-belt to the drum for automatically regulating the feed-belt ratchet mechanism.

6. Mechanism for feeding cigars or other articles to banding, labeling, or wrapping mechanism, comprising a hopper, a feed-belt therein, a pocketed feed-drum at the delivery end of the hopper receiving cigars from the feed-belt, ratchet mechanism for driving the feed-belt step by step, a floating wheel bearing on the cigars or other articles within the hopper, a shield or guard coöperating with the ratchet mechanism and connections between the floating wheel and the guard whereby the ratchet mechanism is stopped or controlled to regulate the feed of the articles.

7. Mechanism for feeding cigars or other articles to banding, labeling, or wrapping mechanism, comprising a hopper, a feed-belt therein, a feed-drum at the delivery end of the hopper receiving articles from the feed-belt, a ratchet wheel connected with the feed-belt, a pawl engaging the ratchet wheel, a shield or guard covering a portion of the ratchet wheel, a floating wheel within the hopper connected with the guard, and a counter-balancing device for the wheel, the arrangement being such that when the feed of the articles is excessive, the guard will be shifted to control the action of the feed-pawl.

8. Mechanism for feeding cigars or other articles to banding, labeling or wrapping mechanism, comprising an oscillating carrier and devices supported by and moving with the carrier for evening the cigars endwise while moving with the carrier.

9. Mechanism for feeding cigars or other articles to banding, labeling, or wrapping mechanism, comprising a carrier for the cigars, a cradle which receives the cigars from the carrier and means for evening the cigars endwise while passing from the carrier to the cradle.

10. The combination of a carrier for cigars, a cradle comprising upper and lower arms which receive the cigars from the carrier, means for evening the cigars endwise as they pass from the carrier to the cradle, means for first moving the upper arms of the cradle and for then moving the arms together and wrapping mechanism which receives the cigars from the cradle.

11. Mechanism for feeding cigars or other articles to banding, labeling, or wrapping mechanism, comprising a carrier for the cigars, having end plates moving therewith, one of which is automatically adjustable toward and from the other as the carrier moves.

12. Mechanism for feeding cigars or other articles to banding, labeling or wrapping mechanism, comprising a carrier having end plates moving bodily therewith and automatically adjustable toward and from each other as the carrier moves, one of said end plates being mounted yieldingly for the purpose specified.

13. Mechanism for feeding cigars or other articles to banding, labeling, or wrapping mechanism, comprising a carrier, vertical plates between which the carrier is arranged, means for adjusting the plates toward and from each other, and means for moving the ends of the carrier automatically toward and from each other as the carrier is moved about its axis.

14. The combination of a carrier, side plates at opposite ends of the carrier, a rock-shaft to which the carrier is attached, a nut adapted to rotate with and to move longitudinally on the shaft and an end plate of the carrier moving back and forth with the nut.

15. The combination of the side plates for the carrier, a rock-shaft extending therethrough, oppositely threaded nuts rocking with but also sliding on the shaft, carrier-arms attached to and moving with the nuts and a yielding plate carried by one member of the carrier.

16. The combination of a pocketed revolving feed drum, oscillating hooks or catches which receive cigars from the drum one at a time, the stationary fingers which strip the cigars from the catches and a carrier to which the cigars are delivered.

17. The combination with wrapping devices and means for feeding bands, of a cradle for supporting an article while being inclosed by the wrapping devices, a clamp engaging the band while being inclosed in the wrapping devices, and means for actuating the clamp.

18. The combination of a wrapping tape, means for supplying bands thereto, a cradle for delivering an article to the wrapping mechanism and a clamping device moving with the cradle for holding the bands on the tape.

19. The combination with an oscillating cradle for supporting an article while being delivered to wrapping devices, of a band clamp moving at times with the cradle and friction devices for permitting the cradle to at times move independently of the clamp.

20. The combination with wrapping devices of a cradle having arms for supporting the article, a shaft on which they are loosely mounted, arms rigidly secured to the shaft and coöperating with the loose arms, friction devices for holding the loose arms stationary while the shaft is being moved to a limited extent, means for causing the loose arms to rise with the other arm at the proper time and a band clamp mounted on the cradle shaft.

21. The combination of a wrapping tape, means for folding it around a cigar and for moving it endwise, a band-carrier provided with gripping devices which hold the bands and deliver them to the wrapping tape, and a clamp which holds the bands on the tape after their delivery thereto by the carrier and while the cigars are being wrapped.

22. The combination of a rotary-carrier, means for actuating it step by step, a series of wrapping tapes, means for supporting them on the carrier, mechanism for actuating the tape supports to cause the tapes to inclose the bands and cigars, and devices for moving the tapes endwise to rotate the cigars and wrap the bands thereon.

23. Wrapping mechanism comprising pocket forming arms, an extensible tape carried thereby, a spring actuated spool on which the tape is wound, and means for opening and closing the arms and for moving the tape endwise after the pocket is formed.

24. Wrapping mechanism comprising pocket forming arms, an extensible tape carried thereby, a spring actuated spool on which the tape is wound, means for opening and closing the arms and means for moving the tape endwise after the arms are closed.

25. Wrapping mechanism comprising pocket forming arms, an extensible tape carried thereby, a spring for drawing the tape in one direction, means for opening and closing the arms, means for moving the tape endwise after the arms are closed, in combination with an oscillating cradle for conveying articles to be wrapped and depositing them upon the tape.

26. Wrapping mechanism comprising pocket forming arms, an extensible tape carried thereby, a spring for drawing the tape in one direction, means for opening and closing the arms, means for moving the tape endwise against the force of the spring, in combination with a cradle moving toward and from the tape for conveying articles thereto and for supporting them on opposite sides of the tape while the pockets are being formed.

27. The combination of a rotary carrier and a series of wrapping devices carried thereby, each comprising pocket forming arms, an extensible tape carried thereby, means for automatically opening and closing the arms, means for moving the tapes endwise, and means for depositing articles to be wrapped upon the tapes while the arms are open.

28. The combination of a rotary carrier, a series of pairs of wrapping arms mounted thereon, means for moving the carrier step by step, a wrapping tape connected with each pair of arms, means for opening and closing the arms, means for moving the tapes endwise, and means for depositing articles to be wrapped on the tapes.

29. The combination of a rotary carrier, a wrapping arm attached thereto, an oscillating shaft mounted in the carrier and carrying another arm, a tape connected with the arms, means for moving the tape endwise, an arm carried by the oscillating shaft, means for holding said last mentioned arm in such position as to close the wrapping arms, and means for, at the proper time, moving said oscillating arm to open the wrapping arms.

30. The combination of a rotary carrier, a series of pairs of wrapping arms carried thereby, wrapping tapes carried by said arms, a series of shafts to which one arm of each pair is secured, a roller carried by each of said shafts, a cam which said roller traverses and which serves to hold the arms closed and to open the arms at the proper time, means for closing the arms and means for moving the tapes endwise after a pocket is formed.

31. The combination of a rotary carrier, a series of pairs of wrapping arms carried thereby, endwise moving tapes supported on the arms, a shaft for each set of arms, a roller carried by each such shaft, a cam traversed by the roller, means for turning the shaft to close the wrapping arms, and a latch which engages the roller immediately after the arms are closed.

32. Wrapping mechanism, comprising pocket-forming arms, an extensible tape carried thereby, means for opening the arms and spreading the tape to an extent sufficient to receive a cigar of any size and to form a pocket in the tape of any size to surround the cigar, means for moving the tape endwise, means for supporting the cigar on opposite sides of the tape while the pocket is being formed, and a device for clamping bands on the tape.

33. The combination of a rotary carrier, wrapping devices carried thereby, means for actuating them, and a moistening device actuated as the carrier rotates to moisten the gummed ends of the bands while in the wrapping devices.

34. The combination of a rotary carrier, wrapping devices carried threby, means for feeding articles and bands to the wrapping devices, means for partially wrapping the bands around the articles, moistening devices actuated as the carrier rotates to moisten the projecting ends of the bands, and means for thereafter drawing in the projecting ends of the bands and causing them to adhere to the portions of the bands which they are caused to overlap.

35. The combination of a rotary carrier, wrapping devices mounted thereon, an oscillating moistening device comprising a moisture reservoir and a freely swinging lever, and a lever geared with the moistener and operated as the carrier rotates.

36. The combination of the opening and closing wrapping arms, endwise moving tapes carried thereby, a magazine for gummed bands, means for withdrawing bands individually from the magazine, means for carrying the bands individually to the wrapping mechanism, means for delivering articles to be wrapped to the wrapping mechanism, means for moistening the ends of the bands, and means for actuating the wrapping mechanism.

37. The combination of the opening and closing wrapping arms, endwise moving tapes carried thereby, a magazine for gummed bands, means for withdrawing bands individually from the magazine, means for carrying the bands individually to the wrapping mechanism, means for clamping the bands thus delivered on the wrapping tapes, means for delivering articles to be wrapped to the wrapping mechanism, means for moistening the ends of the bands, and means for actuating the wrapping mechanism.

In testimony whereof, I have hereunto subscribed my name.

WILLIAM C. BRIGGS.

Witnesses:
R. O. BRIGGS,
MOLLY S. COLE.